US012646066B2

(12) United States Patent
McLachlan et al.

(10) Patent No.:  US 12,646,066 B2
(45) Date of Patent:     Jun. 2, 2026

(54) RADIO NETWORK PULSES FOR CONTACTLESS PAYMENT VERIFICATION

(71) Applicant: Telefonaktiebolaget LM Ericsson (publ), Stockholm (SE)

(72) Inventors: Paul McLachlan, San Francisco, CA (US); Héctor Caltenco, Oxie (SE); Saeed Bastani, Dalby (SE); Fredrik Dahlgren, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 90 days.

(21) Appl. No.: 18/566,609

(22) PCT Filed: Jun. 16, 2021

(86) PCT No.: PCT/IB2021/055342
§ 371 (c)(1),
(2) Date: Dec. 1, 2023

(87) PCT Pub. No.: WO2022/263890
PCT Pub. Date: Dec. 22, 2022

(65) Prior Publication Data
US 2024/0265395 A1      Aug. 8, 2024

(51) Int. Cl.
*G06Q 20/40*        (2012.01)
*G06Q 20/32*        (2012.01)

(52) U.S. Cl.
CPC ..... *G06Q 20/4015* (2020.05); *G06Q 20/3224* (2013.01)

(58) Field of Classification Search
CPC ....................... G06Q 20/4015; G06Q 20/3224

USPC .......................................................... 705/75
See application file for complete search history.

(56) References Cited

U.S. PATENT DOCUMENTS

| | | | |
|---|---|---|---|
| 7,783,299 B2 | 8/2010 | Anderson et al. | |
| 7,885,915 B2 | 2/2011 | Parson et al. | |
| 8,509,805 B2 | 8/2013 | Anderson et al. | |
| 9,832,648 B2 | 11/2017 | Vanderhulst et al. | |
| 10,142,774 B2 | 11/2018 | Alsina et al. | |
| 10,142,784 B2 | 11/2018 | Holden et al. | |
| 10,445,738 B1 | 10/2019 | Waters et al. | |

(Continued)

FOREIGN PATENT DOCUMENTS

| | | |
|---|---|---|
| EP | 3243181 A1 | 11/2017 |
| WO | 2016/112052 A1 | 7/2016 |
| WO | 2017/053033 A1 | 3/2017 |

OTHER PUBLICATIONS

U.S. Appl. No. 18/566,589, PCT/IB2021/055343, Pending.

(Continued)

*Primary Examiner* — Courtney P Jones
(74) *Attorney, Agent, or Firm* — Nicholson De Vos Webster & Elliott LLP

(57) ABSTRACT

A method of a transaction verification service is implemented by an electronic device. The method includes receiving a transaction identifier from a user device or a merchant device, requesting at least one transmitter near the user device or the merchant device to send a location code to the user device or the merchant device, receiving the location code from the user device or the merchant device, verifying the location code, and forwarding the transaction identifier to a payment processing service, in response to verification of the location code.

20 Claims, 13 Drawing Sheets

(56) References Cited

U.S. PATENT DOCUMENTS

| | | | |
|---|---|---|---|
| 10,672,005 B1 | 6/2020 | Hart et al. | |
| 11,132,425 B1* | 9/2021 | Cohen | G06Q 20/4093 |
| 2011/0218880 A1 | 9/2011 | Hammad et al. | |
| 2014/0040139 A1 | 2/2014 | Brudnicki et al. | |
| 2016/0019526 A1* | 1/2016 | Granbery | G01S 1/00 |
| | | | 705/26.81 |
| 2016/0162900 A1* | 6/2016 | Dutt | G06Q 50/01 |
| | | | 705/44 |
| 2016/0248782 A1 | 8/2016 | Troesch | |
| 2017/0091764 A1* | 3/2017 | Lloyd | G06Q 20/4015 |
| 2017/0364918 A1 | 12/2017 | Malhotra et al. | |
| 2018/0293823 A1 | 10/2018 | Gillot et al. | |
| 2019/0122220 A1* | 4/2019 | Phillips | G06F 21/6218 |
| 2019/0205885 A1 | 7/2019 | Lim et al. | |
| 2019/0295088 A1 | 9/2019 | Jia et al. | |
| 2021/0142311 A1* | 5/2021 | Sorbello | G06Q 20/3821 |
| 2022/0027914 A1* | 1/2022 | Connell | G06Q 20/40145 |
| 2022/0129903 A1* | 4/2022 | Sambhar | G06Q 20/308 |
| 2022/0198434 A1* | 6/2022 | Tu | G06Q 20/3278 |
| 2022/0391896 A1* | 12/2022 | Lei | G06Q 20/326 |
| 2023/0360028 A1* | 11/2023 | Vora | G06Q 20/0655 |
| 2024/0179802 A1 | 5/2024 | Li et al. | |

OTHER PUBLICATIONS

U.S. Appl. No. 18/566,609, PCT/IB2021/055342, Pending.

Alexandria White, "More than half of Americans now use contactless payments, according to Mastercard poll," 2020, 6 pages, downloaded from https://www.cnbc.com/select/mastercard-survey-contactless-payments/.

Ericsson AB, "10 Hot Consumer Trends 2030: The Internet of Senses," Dec. 2019, 16 pages, Ericsson ConsumerLab, downloaded from https://www.ericsson.com/4ae13b/assets/local/reports-papers/consumerlab/reports/2019/10hctreport2030.pdf.

Sarah Clark, "Contactless payments growth rate doubles in Nordic countries," 2020, 3 pages, downloaded from https://www.nfcw.com/2020/05/06/366460/contactless-payments-growth-rate-doubles-in-nordic-countries/.

Tamara E. Holmes, "Credit card market share statistics," 2019, 9 pages, downloaded from https://www.creditcards.com/credit-card-news/market-share-statistics/.

The Nilson Report, "Payment Card Fraud Losses Reach $27.85 Billion," 2019, 4 pages, downloaded from https://www.prnewswire.com/news-releases/payment-card-fraud-losses-reach-27-85-billion-300963232.html.

Alexandria White, "More than half of Americans now use contactless payments, according to Mastercard poll," 2020, 4 pages, downloaded from https://www.cnbc.com/select/mastercard-survey-contactless-payments/.

Tamara E. Holmes, "Credit card market share statistics," 2019, 8 pages, downloaded from https://www.creditcards.com/credit-card-news/market-share-statistics/.

The Nilson Report, "Payment Card Fraud Losses Reach $27.85 Billion," 2019, 3 pages, downloaded from https://www.prnewswire.com/news-releases/payment-card-fraud-losses-reach-27-85-billion-300963232.html.

* cited by examiner

PHYSICAL DEVICES AND PHYSICAL CONNECTIVITY

NETWORK FUNCTION VIRTUALIZATION (NFV)

SPECIAL PURPOSE HARDWARE

SPECIAL PURPOSE NETWORK DEVICE 1102

VIRTUAL NETWORK ELEMENT(S)
1130A ••• 1130R

ND CONTROL PLANE 1124

1122

NETWORKING SOFTWARE INSTANCE(S)

CONTROL COMMUNICATION AND CONFIG. MOD. 1132A

1132R

FORWARDING TABLE(S) 1134A

1134R

PROCESSORS 1112

FORWARDING RESOURCE(S) 1114

PHYSICAL NIS 1116

1110

NETWORKING HARDWARE

NON-TRANSITORY MACHINE READABLE STORAGE MEDIA 1118

NETWORKING SOFTWARE 1120

TRANSACTION VERIFICATION SERVICE 1181

ND FORWARDING PLANE 1126

GENERAL PURPOSE (COTS) NETWORK DEVICE 1104

HYBRID NETWORK DEVICE 1106

VIRTUAL NETWORK ELEMENT(S)
1160A ••• 1160R

1162A

1162R

APP(S) 1164A

APP(S) 1164R

1152

SOFTWARE INSTANCE(S)

VIRTUALIZATION LAYER 1154

PROCESSOR(S) 1142

PHYSICAL NIS 1146

1140

HARDWARE

NON-TRANSITORY MACHINE READABLE STORAGE MEDIA 1148

SOFTWARE 1150

TRANSACTION VERIFICATION SERVICE 1181

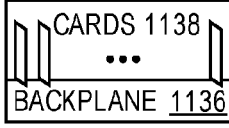

CARDS 1138
•••
BACKPLANE 1136

FIG. 11B

FIG. 11C
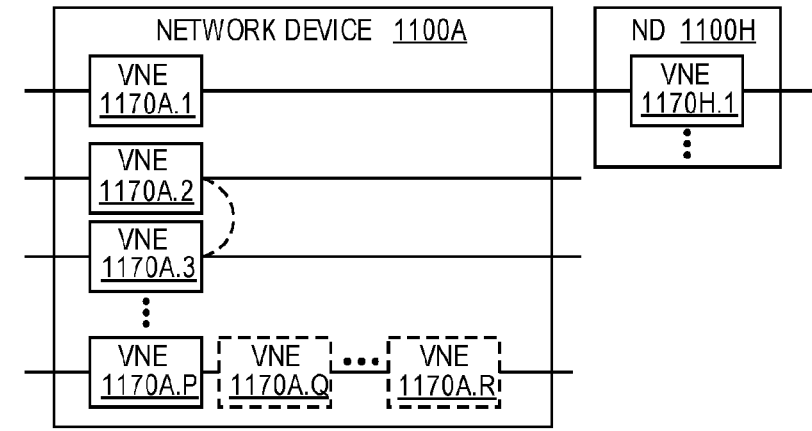
FIG. 11D
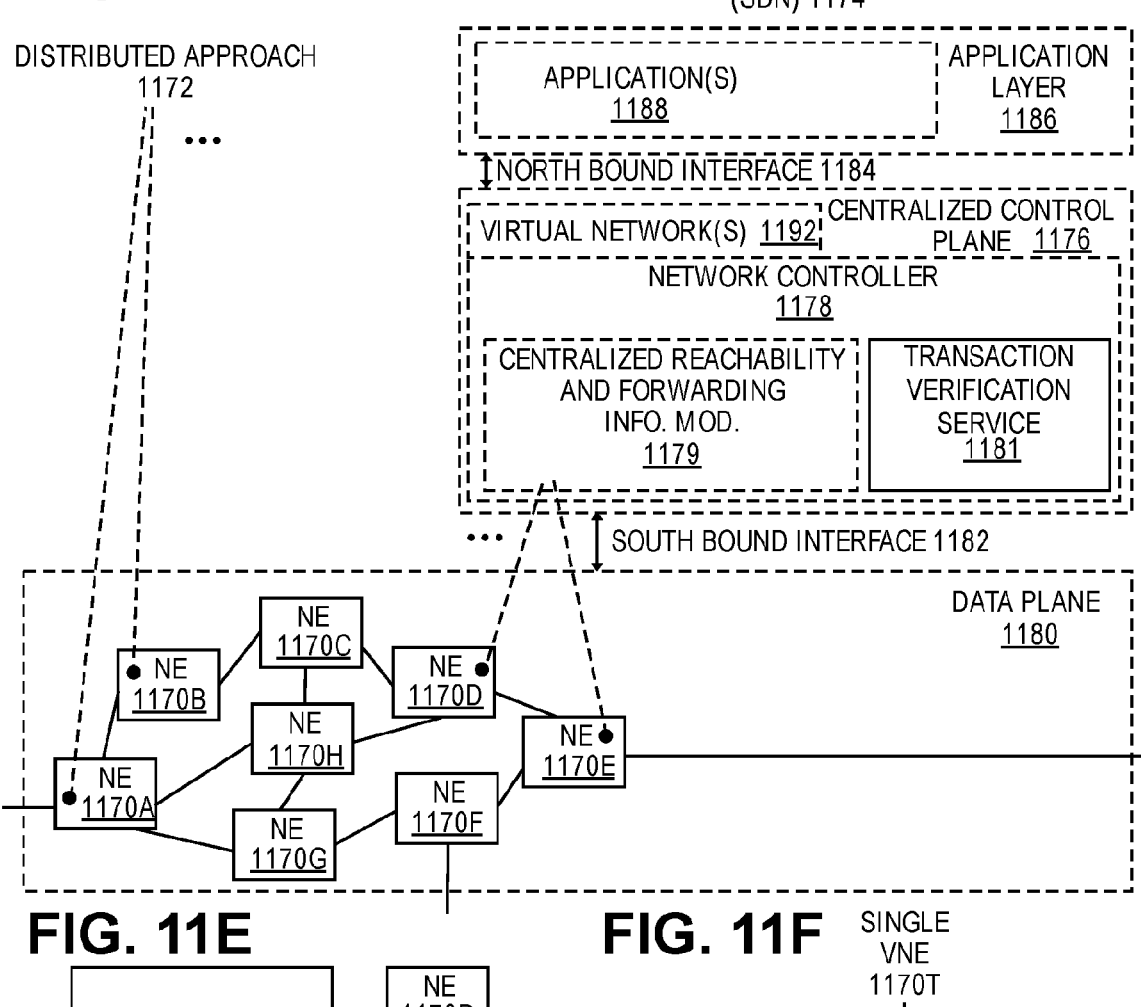
FIG. 11E
FIG. 11F
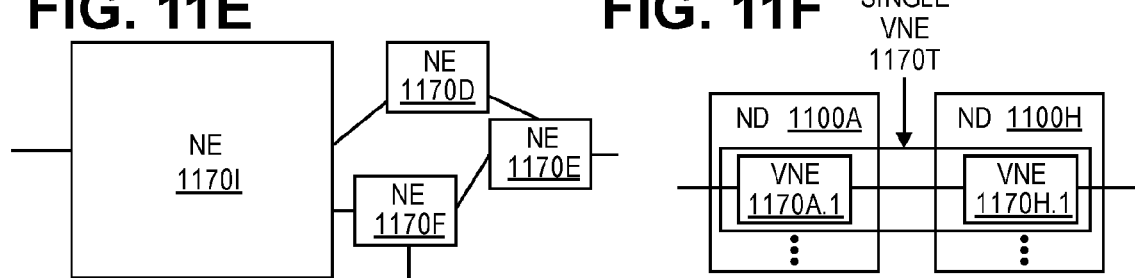

RADIO NETWORK PULSES FOR CONTACTLESS PAYMENT VERIFICATION

CROSS-REFERENCE TO RELATED APPLICATIONS

This application is a National stage of International Application No. PCT/IB2021/055342, filed Jun. 16, 2021, which is hereby incorporated by reference.

TECHNICAL FIELD

Embodiments of the invention relate to the field of payment verification; and more specifically, to the use of radio network signaling to verify a location of a user device to facilitate the verification of a transaction involving the user device.

BACKGROUND ART

Augmented reality (AR) augments the real world and the physical objects in the real world by overlaying virtual content. This virtual content is often produced digitally and may incorporate sound, graphics, and video. For example, a shopper wearing augmented reality glasses while shopping in a supermarket might see nutritional information for each object as they place it in their shopping cart. The glasses augment reality with information.

Virtual reality (VR) uses digital technology to create an entirely simulated environment. Unlike AR, which augments reality, VR immerses users inside an entirely simulated experience. In a fully VR experience, all visuals and sounds are produced digitally and do not include input from the user's actual physical environment. For example, VR may be integrated into manufacturing where trainees practice building machinery in a virtual reality before starting on the real production line.

Mixed reality (MR) combines elements of both AR and VR. In the same vein as AR, MR environments overlay digital effects on top of the user's physical environment. MR also integrates additional, richer information about the user's physical environment such as depth, dimensionality, and surface textures. In MR environments, the end user experience more closely resembles the real world. As an example, consider two users hitting a MR tennis ball on a real-world tennis court. MR incorporates information about the hardness of the surface (grass versus clay), the direction and force the racket struck the ball, and the players' height. Augmented reality and mixed reality are often used to refer to the same idea. As used herein, "augmented reality" also refers to mixed reality.

Extended reality (XR) is an umbrella term referring to all real-and-virtual combined environments, such as AR, VR and MR. XR refers to a wide variety and vast number of levels in the reality-virtuality continuum of the perceived environment, consolidating AR, VR, MR, and other types of environments (e.g., augmented virtuality, mediated reality, etc.) under one term.

An XR device is the device used as an interface for the user to perceive both virtual and/or real content in the context of extended reality. An XR device typically has a display that may be opaque and displays both the environment (real or virtual) and virtual content together (i.e., video see-through) or overlay virtual content through a semi-transparent display (optical see-through). The XR device may acquire information about the environment through the use of sensors (typically cameras and inertial sensors) to map the environment while simultaneously tracking the device's location within the environment.

Object recognition in extended reality is mostly used to detect real world objects and for triggering the display of digital content. For example, a consumer can look at a fashion magazine with augmented reality glasses and a video of a catwalk event would play instantly. Sound, smell, and touch are also considered objects subject to object recognition. For example, a diaper advertisement could be displayed when a sound or mood of a crying baby is detected. Mood could be deduced from machine learning applied to the sound data.

SUMMARY

In one embodiment, a method of a transaction verification service is implemented by an electronic device. The method includes receiving a transaction identifier from a user device or a merchant device, requesting at least one transmitter near the user device or the merchant device to send a location code to the user device or the merchant device, receiving the location code from the user device or the merchant device, verifying the location code, and forwarding the transaction identifier to a payment processing service, in response to verification of the location code.

In a further embodiment, a machine-readable medium comprising computer program code which when executed by a computer carries out the method of a transaction verification service is implemented by an electronic device. The method includes receiving a transaction identifier from a user device or a merchant device, requesting at least one transmitter near the user device or the merchant device to send a location code to the user device or the merchant device, receiving the location code from the user device or the merchant device, verifying the location code, and forwarding the transaction identifier to a payment processing service, in response to verification of the location code.

In one embodiment, an electronic device executes a method of a transaction verification service. The electronic device includes a non-transitory machine-readable medium having stored therein a transaction verification service, and a processor coupled to the non-transitory machine-readable medium, the processor to execute the transaction verification service, which includes receiving a transaction identifier from a user device or a merchant device, requesting at least one transmitter near the user device or the merchant device to send a location code to the user device or the merchant device, receiving the location code from the user device or the merchant device, verifying the location code, and forwarding the transaction identifier to a payment processing service, in response to verification of the location code.

BRIEF DESCRIPTION OF THE DRAWINGS

The invention may best be understood by referring to the following description and accompanying drawings that are used to illustrate embodiments of the invention. In the drawings:

FIG. 11A illustrates connectivity between network devices (NDs) within an exemplary network, as well as three exemplary implementations of the NDs, according to some embodiments of the invention.

FIG. 11B illustrates an exemplary way to implement a special-purpose network device according to some embodiments of the invention.

FIG. 11C illustrates various exemplary ways in which virtual network elements (VNEs) may be coupled according to some embodiments of the invention.

FIG. 11D illustrates a network with a single network element (NE) on each of the NDs, and within this straightforward approach contrasts a traditional distributed approach (commonly used by traditional routers) with a centralized approach for maintaining reachability and forwarding information (also called network control), according to some embodiments of the invention.

FIG. 11E illustrates the simple case of where each of the NDs implements a single NE, but a centralized control plane has abstracted multiple of the NEs in different NDs into (to represent) a single NE in one of the virtual network(s), according to some embodiments of the invention.

FIG. 11F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
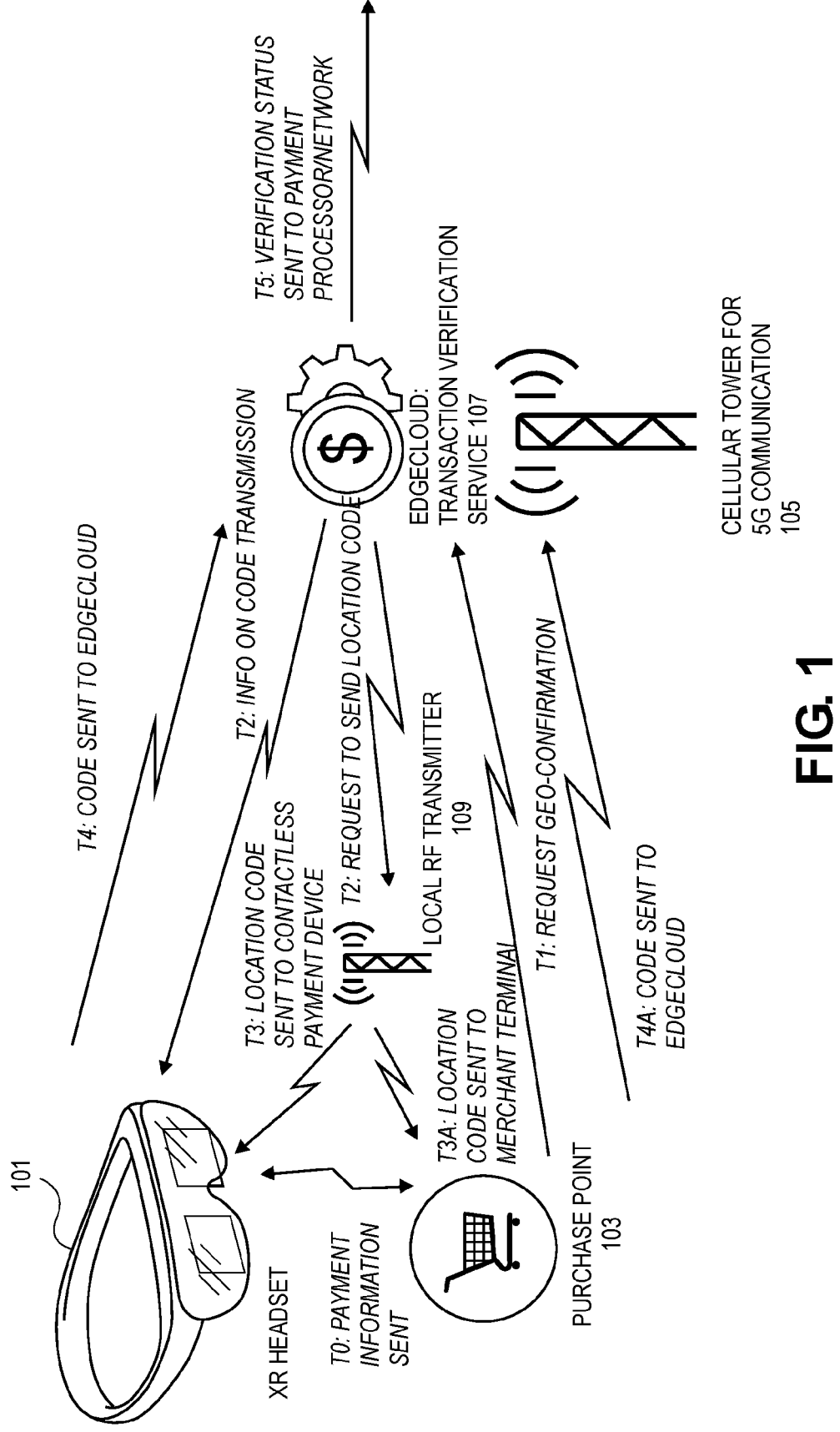
FIG. 1 is a diagram of one example embodiment of an example network implementing a transaction verification service.

The following description describes methods and apparatus for a transaction verification service and processes. The transaction verification service and processes can verify the location of a user device that is seeking to engage in a transaction (e.g., a purchase of an item or service at a merchant). Verifying the location of the user device ensures that only user devices that are at the location associated with the transaction are allowed to complete such transactions. The transaction verification services can be part of XR services, and the user device can be an XR user device. The transaction verification utilizes nearby devices including transmitters of merchant devices, base stations, and other user devices to transmit a temporary location code that the user device attempting the transaction must receive and provide to the transaction verification services. If the user device attempting to complete the transaction is not in the target merchant location, then it will not be able to obtain the location code and verify its presence for the transaction. Similarly, the merchant devices and other devices in a geo-referenced area associated with the transaction can report receipt of the location code and in some embodiments interaction with the user device attempting the transaction.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments provide support for use of contactless payment methods. In contrast to traditional plastic credit cards, contactless payment methods are based in user device applications. Examples of contactless payment methods and systems include Apple Pay by Apple, Inc. and Google Pay, by Google, Inc. Contactless payment methods can be used in combination with other technologies such as extended reality (XR) systems.

XR systems are likely to be paired with emerging mobile technologies, such as 5G New Radio (NR) and paired with edge and cloud computing (hereinafter, "edgecloud") to solve most of the barriers that have hitherto blocked XR's widespread adoption. With XR, end users and user devices will be able to view and select objects within their environment: acquire additional information about the object such as its manufacturer; and purchase the object via mobile wallets associated with the user device either independently or in coordination with merchant devices. While contactless payment methods facilitate payments for new use cases such as online shopping and shopping in XR, they also take a variety of common fraud detection and minimization techniques off the table. Retailers and credit card networks use a variety of techniques, including AI and machine learning, to flag and reject fraudulent contactless transactions. Yet, contactless payments make a variety of common techniques including verifying the physical integrity of credit cards, chip and PIN numbers, and identity verification impossible for retailers and other points of sale.

To improve the security of contactless payment methods, location verification can be utilized as a critical tool to minimize fraud in contactless payment methods. Location verification mitigates against multiple forms of payment fraud involving contactless payment methods and digital wallets. For instance, nearfield communication techniques such as radiofrequency identification (RFID) can be utilized to guarantee the user device is close to a merchant terminal. Yet, RFID cannot guarantee the payment method has not been cloned or stolen. The processes and systems of the embodiments combine absolute and relative location verification as part of a contactless payment verification system to minimize these kinds of risks. The contactless payment verification system provides a method to verify the location of where a payment is occurring, either to ensure it is near the end user device, near the merchant's device, or located within the vicinity of the service or good for which payment processing is requested.

In the embodiments, as used herein, location verification refers to technical solutions to compare user device reported location against its true location. To do so, the embodiments contrast between absolute and relative position of the involved devices. In this context, absolute position implies being in a specific fixed geographical area, for example a certain city, block, or room, whereas relative position in this context implies being close to another object (i.e., a reference object) that is not tied to a specific fixed geographical place, for example a person, a device, or a vehicle. Direct contrasting of the absolute position and relative position can rely on the absolute position of the reference object also being available. However, another embodiment is to use these two types of position information in a joint verification scheme, i.e., the user device's absolute position and its proximity to a reference object are both verified at the same time. Scalable verification systems need user devices to report their location and be able to verify that location rapidly. Today, user devices primarily use global positioning systems (GPS), cell tower triangulation, and similar technologies for geolocation. GPS, cellphone triangulation, and similar technologies are easy to spoof. This highlights the need for a network-based location verification system to avoid spoofing that is possible with existing technologies. The embodiments address issues with spoofing as well as complement other location verification processes that have high latency or are not scalable.

The embodiments provide a network architecture for the contactless payment verification system that verifies the location of contactless payment devices (e.g., merchant devices) and end users' devices in the environment. To do so, the contactless payment verification system uses codes provided by transmitters as a basis to verify the user devices used to process contactless payments from digital wallets are in the location that they assert to be in. These codes are used to verify a payment method for example a digital wallet or similar contactless payment method as being in a geo-referenced area. These geo-referenced areas can be used to verify either the user device's absolute or relative position in support of the contactless payment method.

The embodiments provide a mechanism to support end users to make contactless payments via their mobile wallets. The method and system are responsive to an attempt to make a contactless payment from a user device (e.g., using their mobile wallet). The contactless payment verification system utilizes a local transmitter to send a location code to the user device for purposes of location verification. The user device provides the location code to the contactless payment verification system to verify that the location of where the payment is occurring is within an associated geo-referenced area. The contactless payment verification system compares the received location code from the user device with the location code received from a merchant's device. The contactless payment verification system verifies the location of where the payment is occurring is within the same geo-referenced area as that of a service offered by the merchant when the location codes match. The contactless payment verification process then provides permission to proceed with the transaction. The embodiments of the contactless payment verification also introduce a variety of additional features that support these and additional use cases.

The embodiments provide a number of advantages over the prior art. The advantages include to provide a system and process for transmitters to distribute location codes via pulses that are needed to verify user device location for purposes of making contactless payments. The embodiments can use available services or merchant terminals to define geo-referenced areas into which user device locations are verified for purposes of making contactless payments. The embodiments provide the ability for transmitters to distribute codes to multiple devices simultaneously for purposes of location verification. This also reduces the latency of location verification for purposes of contactless payment verification. The embodiments can use signals carrying location codes (or portions of location codes) sent from multiple transmitters to increase the trust in and precision of the location of a particular device for purposes of making contactless payments. Where the signals carry a portion of a location code the user device can consolidate the different portions to create the whole location code.

The embodiments provide the capability to use RF pulses and location codes to verify user device location for purposes of verifying contactless payment methods associated with the user device. The embodiments further provide the capability to use RF pulses and/or location codes to verify user device location to access paid-for services within a given environment. The embodiments perform location verification using location codes (e.g., in the form of broadcast key distribution) without requiring individual devices to perform handshaking for purposes of making a contactless payment. The embodiments can use RF pulses to perform location verification for a specific geographical area as well as an area at a specific other device as well as a combination of the two The embodiments provide a method to use radio frequency (RF) pulses or similar signaling to verify device location for purposes of contactless payments and card not present (CNP) transactions. The embodiments utilize location verification to help prevent fraud and to thereby support confidence in related technologies (e.g., XR). Although technology such as two-factor authentication (2FA) are already used for this purpose, many 2FA methods are easily spoofed such as text message verification codes or IP address matching.

The embodiments utilize local transmitters and RF pulses and similar signaling to send location codes to user devices. Because the transmitters have limited range, only user devices that are located within that range will be able to receive the pulse and hence access the correct location code. The range of distributed signals from transmitters varies according to the type of transmitter, output power, frequency, direction (e.g., via beamforming), characteristics of the propagation environment, and communication standard (e.g., 3GPP version, Bluetooth, 802.11, 5G NR, or similar technologies). The transmitters can be at a known-but-unverified or unknown-and-unverified location and can be connected to a location verification service through a location verification gateway or similar interface. The basic principle is that the edgecloud location verification service will identify a transmitter in a target area and request a transmitter in that area to distribute a code (once or repeatedly). The location verification service will request the user device to receive the code and provide information on how to receive it and/or re-transmit the code (standard, frequency, timing, and similar characteristics). The location verification service can then verify the position of the user device by using that location code. The transaction verification service then allows transactions to proceed once the location code is verified.

The location verification process for contactless payments can be used with different schemes of verifying location with different types of transmission of location codes and different requirements of momentary proximity. The same type of location verification process and supporting network architecture framework can be used to verify proximity to a geographically fixed location as well as a device which can be moved, enabling complementary schemes for prohibiting spoofing. The location verification process and system can be used to verify different degrees of proximity to multiple RF transmitters, e.g., within a meter of a certain cashier device as well as within a certain city, making certain the merchant device is not at an unexpected or unknown place. Whereas normal communication processes aim to maximize range, the location verification process inherently aims at keeping the range limited within a certain area. User devices will not be able to spoof their location because only devices in the target location will have access to the location code. The communication between the user device, e.g., via a base station, and the edgecloud and the location verification service to distribute the location code are different and there are several different options for each. There are several different potential technologies for how to transmit the location code locally. e.g., to be distributed by a local Bluetooth transmitter, 4G radio access network, Wi-Fi/802.11, 5G NR, or similar technologies. The characteristics of these technologies in terms of availability and range differ, which is a feature of this approach, and the user device will need information on how and when to receive the location code based on the utilized transmitter technology. In some embodiments, an authentication process for user devices can be used in combination with the location verification services (e.g., prior to location verification of user devices).

FIG. 1 is a diagram of one example embodiment of a network implementing a transaction verification service 107. The example of FIG. 1 is an overview of the processes related to the transaction verification service. In the example, a user device 101 such as an XR headset or similar user device sends payment information to a point of purchase (POP) (e.g., a merchant device 103) at a merchant location (T0). The example of an XR headset is given by way of example and not limitation. The embodiments are applicable to XR environments but are not limited to use in XR environments and are compatible with any user devices (e.g., smartphones, wearable devices, and similar user devices) that may be used in purchasing items and support payment and wallet services. In some embodiments, one or more communications between the transaction verification service 107 and the user device 101 and/or the merchant device 103 can be transmitted via one or more base stations (e.g., 5G cell tower 105).

The merchant device 103 at the POP requests a location verification (i.e., geo-confirmation) of the user device 101 (T1). In other embodiments and scenarios, a merchant device in the POP may not be involved. The location verification request is received by a transaction verification service 107, which can incorporate location verification services as a sub-component or as an integrated function. The transaction verification service 107 identifies a transmitter 109 in the geo-referenced area associated with the POP (T2). The transmitter 109 associated with the target geo-referenced area is then directed to send a location code for the geo-referenced area to the user device 101 (T3) and the merchant device 103 (T3A). The transaction verification service 107 can also send information about the mechanism (e.g., technology, protocols, or similar characteristics) by which the location code will be sent to the user device 101 (T2). In some embodiments, the mechanism by which the location code will be sent is also provided to the merchant device. The user device 101 (T4) and the merchant device 103 (T4A) report the received location code to the transaction verification service. The transaction verification service determines whether the reported location codes match the transmitted location code. The location code that is sent via the transmitter 109 to the merchant device 103 and the user device 101 can be selected and tracked by the transaction verification service 107, known to the transaction verification service 107 based on a scheme of location code correlations to transmitters and/or geo-referenced areas (e.g., a fixed correlation between the transmitter and a location code or a deterministic changing of location codes per transmitter and/or geo-referenced area over time), or by similar location code sharing or determination mechanisms. In embodiments where the transaction verification services execute at the edge cloud, the instances of the transaction verification service co-located with a transmitter have knowledge of the correlated location code. In embodiments where the transaction verification services execute remote from the transmitters, the transaction verification services have knowledge of the location code scheme or can obtain the location code from the transmitters or other tracking source. In further embodiments, the transaction verification services can dynamically generate or participate in the dynamic generation of location code (e.g., per verification or time period) and share the location codes with the transmitters when a request is made to transmit the location code or at the time of dynamic generation. If the location codes match and all other criteria are met, then the transaction verification service can signal to a payment processor or similar entity that the transaction has been verified (T5).

Various forms of contactless payment fraud exist, and each illustrates the utility of the location verification method and transaction verification service of the embodiments. These examples include (1) device cloning and theft, (2) RFID fraud, and (3) digital purchase fraud. In the first instance, RFID-enabled devices are either cloned or stolen. This allows fraudsters to make purchases without the rightful owner's consent or knowledge. In the second case, individuals place fraudulent or malicious RFID transponders in the environment that attempt to charge contactless payments without the consumer's consent or knowledge. In the final case, websites, and/or XR content attempt to charge consumers without their consent or knowledge. More detailed examples of these security risks are provided to illustrate the importance of location verification for contactless payments and transaction verification.

Device cloning and theft refers to any attempt by fraudsters to duplicate or steal contactless payment methods and digital wallets. Transaction verification in the embodiments provides a method to verify that the contactless payment is occurring (1) in the vicinity of an associated device, such as a cell phone and/or (2) near the merchant attempting to process a payment. By allowing credit card processors to decline a transaction when location verification fails, the transaction verification service makes financial fraud more difficult.

In one example of cloning, two vehicles pass through a toll both. The first vehicle with user device 1 has the original transponder to process payments for electronic tolls. The second vehicle has a second user device 2 that clones the first by cloning the radio frequency signal from the first user device 1. This allows charges to be made to the account associated with user device 1 without the owner's permission. Location verification could help prevent such malicious purchase by pinging the transponder to verify it is located near the location where the contactless credit card or digital wallet is being used.

In another example, a thief has stolen a consumer's contactless credit card. As many merchant terminals have moved away from PIN, signature, and identity document checks to verify the cardholder's identity, once stolen, a contactless credit card can be used until it is reported stolen or frozen due to suspicious activity. The proper owner is not notified of the purchases being made via an app on their mobile phone because they have not yet reported the card stolen. Location and transaction verification of the embodiments could help prevent such malicious purchase by pinging the end user's device to verify it is located near the location where the contactless credit card or digital wallet is being used.

The second type of fraud highlighted is RFID fraud. RFID fraud refers to the installation of malicious RFID payment terminals within an environment. When consumers pass within these terminals' location, they scan for contactless credit cards to either post fraudulent charges immediately or store the credit card information for later use. In this scenario, location verification is used to ensure that the contactless card or digital wallet is physically located within the vicinity of the merchant terminal. This guards against card skimming for future reuse.

The payment processes because credit card payment networks cannot currently distinguish between authentic charges and ones made without end user consent. Location verification could help prevent such malicious purchase by pinging the end user's device to verify it is located near the terminal where the contactless credit card or digital wallet is sending payment.

The third type of fraud example is digital purchase fraud, which refers to an instance when an application, website, or service attempts to charge consumers without their awareness and/or bundle services such as automatic renewals with a purchase. Location verification reduces the number of such transactions by ensuring the consumer is still located within the vicinity of the service that is attempting to access the end user's digital wallet or contactless credit card. This can be processed fraudulently by changing the purchase amount, signing up for recurring payments, or skipping verification steps such as FaceID for Apple Pay. Location and transaction verification could help prevent such malicious purchases by pinging the end user's device to verify it is located near the location of the service which is trying to charge the contactless credit card or digital wallet.

The embodiments use RF transmitted location codes to verify a user device's location within a 'geo-referenced area.' A geo-referenced area is a defined geographic area in the real world that has been given a label or reference such as an index. These geo-referenced areas can be indexed in the edgecloud by a GeoreferenceID or similar identifier, which contains information about the location of the geo-referenced area, its dimensions, and similar characteristics. Merchant payment systems then associate their validated payment devices with a geo-referenced area that the merchant devices fall within. This geo-referenced area is associated with various forms of information, either to verify contactless payments or payments made with digital wallets. To verify contactless payments, the geo-referenced area may contain data about the location of merchants' devices. To verify payments made via digital wallets, the geo-referenced area may contain further data about the services available in the region such as entertainment, media, visual overlays for XR environments, or similar services.

Figure 2:
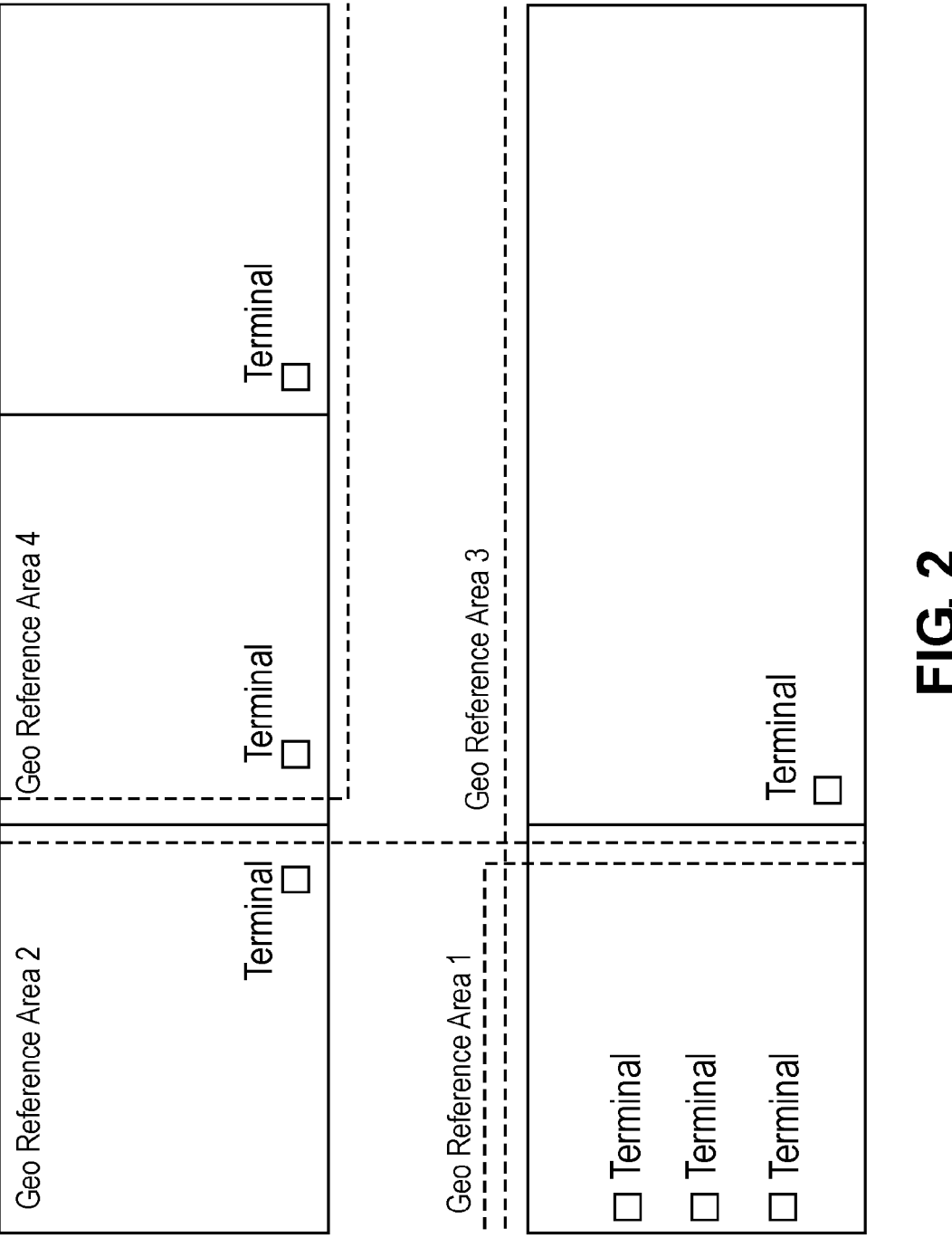
FIG. 2 is a diagram of example geo-referencing areas for an example application of the transaction verification service.

FIG. 2 is a diagram of one example of geo-referencing in support of transaction verification services. The diagram shows multiple geo-referenced areas and merchant devices (i.e., 'terminals'). In the embodiments, location codes (e.g., sent by RF pulses) are used to verify the physical presence of a user device executing a contactless payment within a geo-referenced area where a merchant device or terminal is located. A geo-referenced area can contain information about the merchant(s) and merchant devices (terminals) that exist within the area. In the diagram, the solid lines define the outlines of different brick and mortar stores. The dotted lines define geo-referenced areas. Thus, in the illustrated example of the diagram, geo-reference area 1 has three 'terminals,' geo-reference area 2 has four 'terminals,' geo-reference area 3 has 4 terminals, and geo-reference area 4 has two terminals. Some of these example geo-reference areas overlap, however, in other embodiments, the geo-referenced areas may not overlap. The embodiments verify a payment method within the geo-referenced area, which can then be used to verify payments made to merchants within the geo-referenced area.

Figure 3:
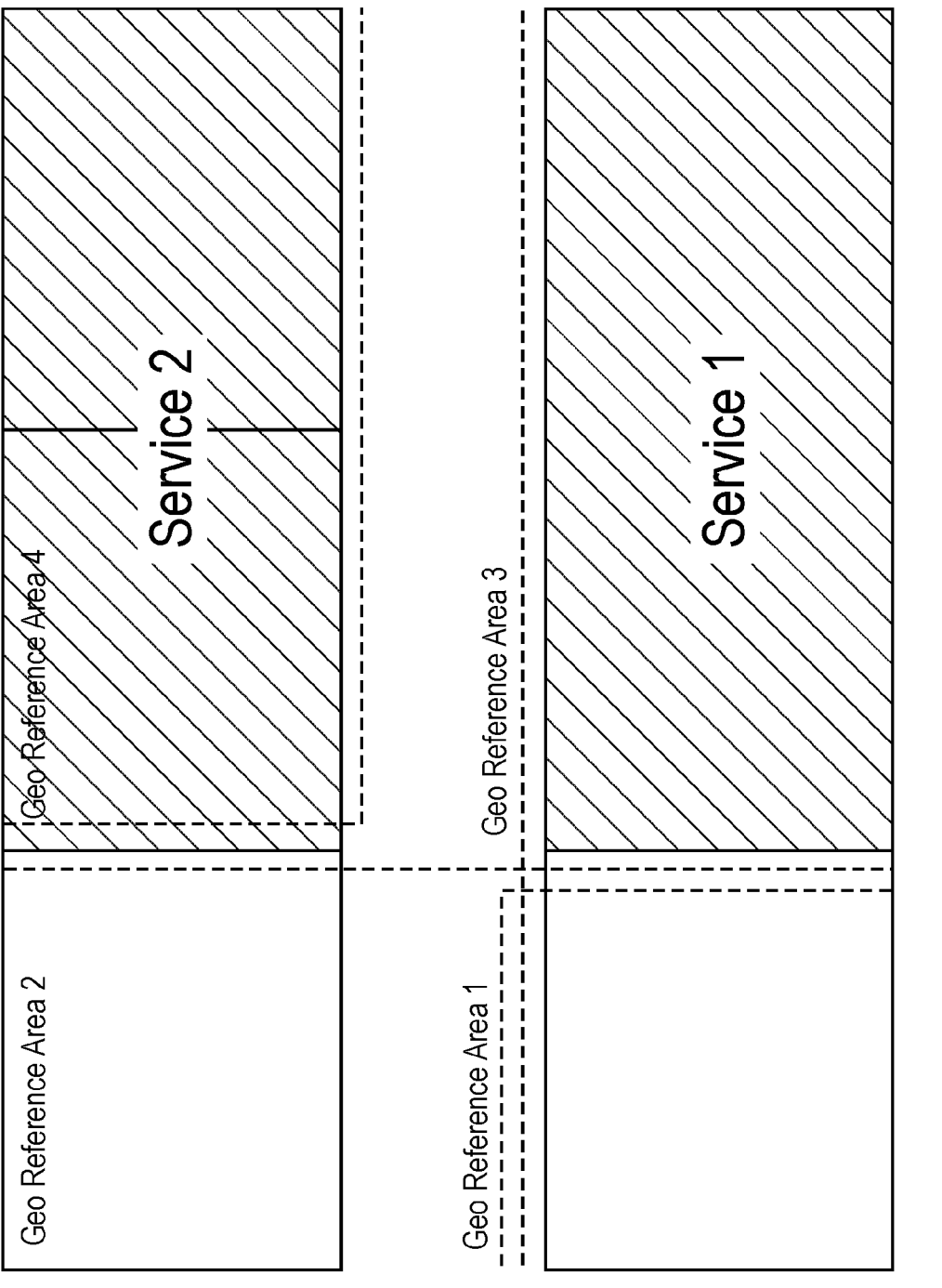
FIG. 3 is a diagram of another example of geo-referencing areas for an example application of the transaction verification service.

FIG. 3 is a diagram of one example of geo-referenced areas that are associated with particular services. The services can provide types of media or experiences to user devices. In the embodiments, location codes are used to verify the physical presence of a user device that supports a contactless payment method within a geo-referenced area where the service is located. A geo-referenced area can contain information about the services that exist within the area. In this example, service 1 exists within a portion of geo-referenced area 3 and service 2 exists within geo-referenced area 4. The embodiments verify a contactless payment within the geo-referenced area, which can then be used to verify payments made for services within the geo-referenced area.

The embodiments improve on other types of location confirmation by the infrastructure of a mobile network (e.g., at base stations) that might have different aims (e.g., emergency location). The other types of location confirmation do not scale by using other types of transmitters where needed to improve the location verification accuracy. Similarly, user device centric positioning technologies can provide adequate accuracy for other purposes, but these technologies do not guarantee that the user device is actually where it purports to be and are subject to spoofing.

The embodiments use geo-referenced areas as part of the location verification process to overcome these limitations of other location technologies. The geo-referenced areas are three-dimensional divisions of physical space and corresponding spatial maps that are generated to represent the physical space. The geo-referenced areas are three-dimensional units whose metadata and description, which can be stored in the edgecloud or similar location in the network, contain information about the merchant devices, services, and similar elements available for purchase or located within the geo-referenced area. Geo-referenced areas can be defined without having a transmitter associated with them. However, to be utilized as part of the location verification process and transaction verification service, a geo-referenced area must have at least one transmitter (e.g., cell tower) to send location codes (e.g., via RF pulses).

Suitable sizing of geo-referenced areas can be advantageous for scalability and fine granularity of location verification in terms of differentiated verification policies. From a scalability perspective, assuming multiple transmitters are available in an area (e.g., a city), partitioning a big area into smaller areas and assigning each small area to a transmitter will decrease the latency of the location verification process (compared to one transmitter serving a large area with many users). The partitioning to smaller areas (e.g., to a landscape level) will allow for differentiation in location verification and make it possible to apply various levels of verification policies for various areas. For example, for security critical areas (if partitioned carefully) the transaction verification services can apply more rigorous location verification compared to less critical areas and limit the user device accordingly. Therefore, depending on the use case, the size of an area can be as large as, for instance, a whole city or as small as a room in a building.

In some embodiments, each geo-referenced area is indexed by a unique alphanumeric identifier referred to as a GeoreferenceID. The GeoreferenceIDs are stored in the edgecloud or similar location in the network accessible to the edgecloud. In some embodiments, geo-referenced areas are cubes, and the shape is defined by the bottom left latitude, longitude, and altitude (in meters) along with the top right latitude, longitude, and altitude (in meters). A cubic form can then be derived based on those points. In other embodiments, other shapes of the georeferenced areas can be utilized, and similar information maintained to define those shapes.

the location area, e.g., the lowest in altitude, southmost, and westmost point of the cube. A second sixteen-digit latitude, a second sixteen-digit longitude, and a second altitude in meters are used to define a second corner of the cubic location area that is diametrically opposite of the first corner, for example, the top right corner of the location area, e.g., the highest in altitude, northmost, and eastmost point of the cube. The checksum validates the GeoreferenceID. In this case, the resulting GeoreferenceID is 001001000000000000000000001000000000000000000000 00000000000000010000000000000 0000001.

The embodiments also utilize an identifier for transactions. Every transaction managed by the transaction verification service (e.g., each contactless payment) can be indexed by a unique alphanumeric identifier called a TransactionID. These can be generated by a digital wallet associated with a user device, by a merchant's device that is engaged in the transaction, at the transaction verification service, or similar location in the system. Any process can be utilized to generate a TransactionID, either in a user device, merchant device, at the edgecloud, or similar location. The transaction identifiers can be used to transmit the particulars about the transaction, including a purchase amount, payment type, time, date, payment method, merchant information, product information (e.g., SKUs), and similar information. The TransactionID can have any format or size and be associated with any combination of related data. The format can vary depending upon the applications, user devices, merchants, and payment network. An example TransactionID is shown below in Table II by way of example and not limitation.

TABLE I

| 001 | 001 | 00.0000 | 00001 | 00.0000 | 00.000 | 00001 | 00.0000 | 0001 |
|---|---|---|---|---|---|---|---|---|
| Private or public ID | Use Code | Latitude | Altitude | Longitude | Latitude | Altitude | Longitude | Checksum |

Table I is an example GeoreferenceID. The first three characters define whether a spatial map or similar mapping data structure associated with that geo-referenced area is private or public, e.g., whether end users must authenticate prior to accessing it. The use code can be assigned by a payment processing network or merchant network. A first sixteen-digit latitude, a first sixteen-digit longitude, and a first altitude in meters are used to define a first corner of a cubic location area, for example, the bottom left corner of

TABLE II

| 20200101 | 01010101 | ABC123 | 100.00 | 0001 | 0001 | 00000000001 |
|---|---|---|---|---|---|---|
| Date [Year, Month, Day] | Hour, Minute, Second, Millisecond | Unique Merchant ID | Purchase Amount | Payment Method | Payment Network | SKU |

In the example TransactionID, the first eight digits are the year, month, and date the TransactionID was generated. The next eight digits are the hour, minute, second, and millisecond the TransactionID was generated. The unique merchant ID is an alphanumeric code assigned by the merchant, credit card, or payment method that uniquely indexes the merchant or payment recipient. The purchase amount is the total amount in a given currency invoiced across the payment network. The payment method is a four-digit code that describes the payment method, such as credit card, electronic cash transfer, cryptocurrency, or digital wallet. The following four digits index the payment network, such as Visa or MasterCard. The SKU is a value that is unique to each product or service included in the transaction. In this case, the resulting TransactionID is 2020010101010101ABC123100000001000100000000001.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 4:
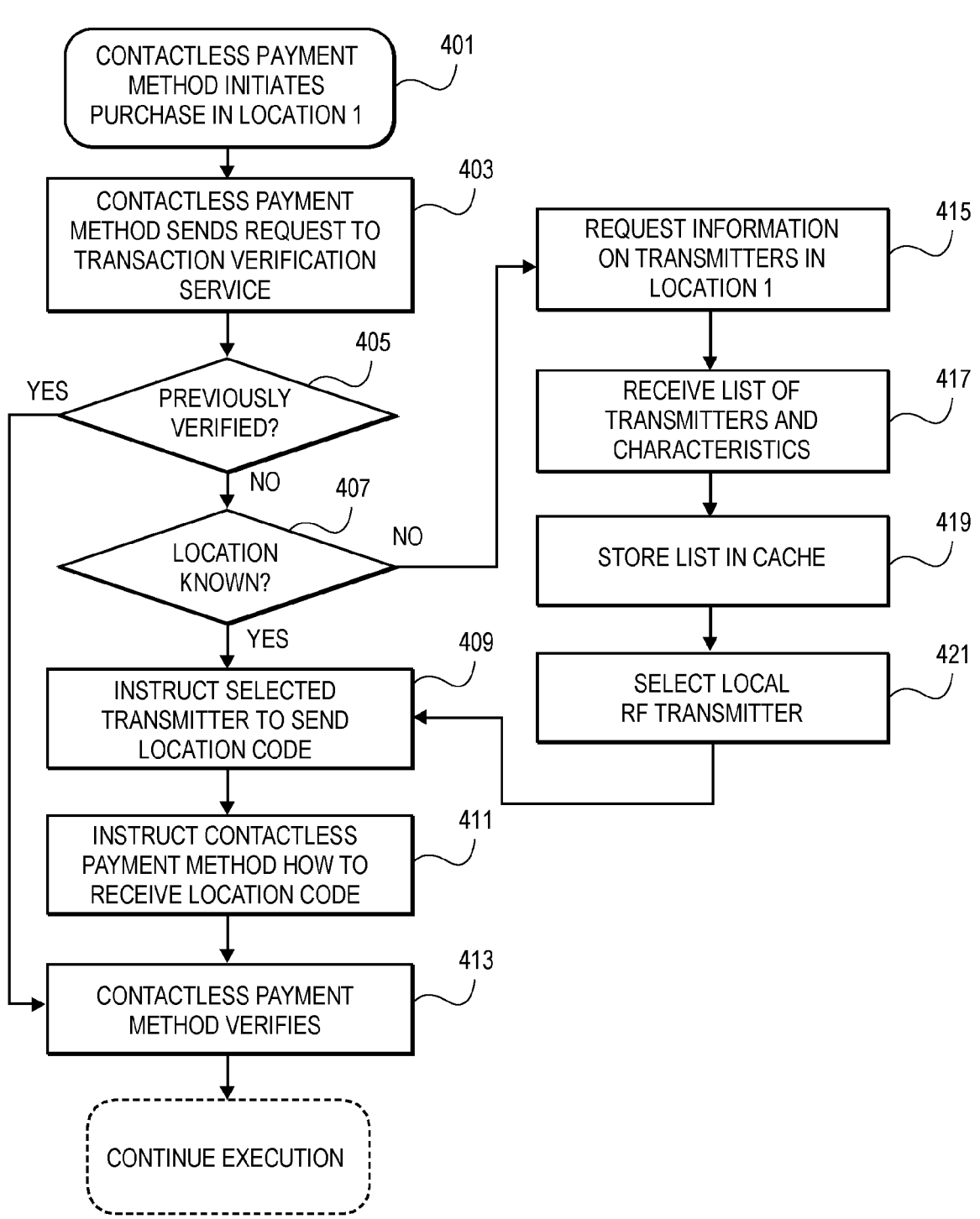
FIG. 4 is a flowchart of one embodiment of a process of the transaction verification service.

FIG. 4 is a flowchart of one embodiment of an overall operation of the transaction verification service in the edgecloud. In some embodiments, one or more communications between the transaction verification service and the user device and/or the merchant device can be transmitted via one or more base stations. The process is initiated where a contactless payment method is utilized to initiate a purchase (Block 401). In this example, the purchase is stated to be initiated in location 1, which may be referenced or correlated with a geo-reference area by the transaction verification service. The contactless payment method sends, e.g., via a base station, a request for verification to the transaction verification service at the edgecloud (Block 403). The transaction verification service can check whether the user device is previously verified at the location (Block 405), in which case the transaction can be verified (Block 413). The previous verification can be determined to be within a predefined timeframe, threshold, or similar measure, which can range from a few seconds to days or weeks. A verified transaction can cause the transaction verification service to notify the user device, merchant device, payment processor and similar entities in the transaction. If the user device has not been previously verified, then the process checks whether the location identified in the received verification request (e.g., a geo-referenced area) is known to the transaction verification service at the edgecloud (Block 407).

If the location is not known, then the transaction verification service determines which transmitters are available in the location. This can be done by requesting information on transmitters in location 1 from the mobile network resources, the transmitters, other transaction verification service instances, or similar resources (Block 415). The transaction verification service then receives the list of transmitters and the characteristics of those transmitters (Block 417). The characteristics of the transmitters can include range, protocols, transactions, and similar characteristics of the transmitters. The listing of transmitters can then be stored in a local cache (Block 419) such that it does not have to request and receive the information again. In some embodiments, the transaction verification service can periodically and/or asynchronously update or maintain the transmitter information for each geo-referenced area or frequently accessed geo-referenced areas. Once the list of available transmitters is assembled, then the process can select at least one transmitter to utilize to send a location code to the user device (Block 421). The transmitter can be selected based on its characteristics such as range and/or technologies supported. For example, the process can select the transmitter that is closest to the merchant device or POP, has the smallest range, has the least load, reliability, trustworthiness, and/or a transmission technology that is supported by the user device to maximize the proximity and accuracy of the verification.

If the location is known, or after obtaining the location information, the process can instruct a selected transmitter to send a location code to the user device (Block 409). The location code can be any type of unique identifier, key, token, or similar element that is encrypted or unencrypted that is correlated with the geo-referenced area or location. The contactless payment method (e.g., an application at the user device) can be sent, e.g., via a base station, a notification of the technology, protocols, or similar characteristics of the transmission of the location code that are to be utilized such that the user device can receive and derive the location code (Block 411). In some embodiments, characteristics of the transmission are provided, e.g., via a base station, to merchant devices participating in the transaction as well. The contactless payment method then verifies the transaction (Block 413) and the transaction can be further processed by the user device.

In some embodiments, the location codes use radio frequency pulses (RFPs) as a token or certificate that user devices can use to verify their location. The RFPs are electromagnetic signals emitted from a transmitter that is already installed in the environment (e.g., the ceiling, for line of sight transmissions) and whose location is verified. RFPs are a sequence that are either randomly generated or generated using clues from the environment. Pulse transmissions are calibrated such that they can only be received within a pre-defined radius. Using beamforming, transmission power adjustment, or time of flight (signal airtime), such calibrations can enable accurate transmission. Base stations in mobile networks can transmit RFPs in a broadcast/multicast fashion. When compared to other verification methods, such as sending tokens via email or linking to token files, using RFPs facilitates token distribution and end user authentication speed. The verification process matches the location codes reported by the user device and/or participating merchant devices with the location code sent by the selected transmitter. Where verification is successful, the transaction verification service notifies the user device, merchant device, and payment processor to enable the transaction to complete.

In some embodiments, absolute position, relative position, or combinations thereof are used in the verification process. An absolute position utilizes a geographically verified transmitter to provide a location code to the participating devices. A relative position utilizes a mobile device, e.g., a user's watch, to transmit a location code. In an example of combined positioning, the watch's location code can be dependent or derived from the location code being provided by the fixed (absolute) transmitter, and the target devices need to get both codes for verification. In this case, the target devices are known to be in a certain absolute area, and close to the watch (or similar non-participating user device), and the watch is also in that same absolute area.

The embodiments also enable the geo-referencing of services. A service can be any activity or similar thing purchased that is not a product. For example, an audio tour of a museum, visual overlay in an XR environment or similar services. In some embodiments, a service can only be enabled in a certain location (or a set of certain locations), or can be enabled anywhere except at certain locations. In other cases, a service can only be enabled if a user device is close to a certain other mobile device (e.g., that other device can be the user's own watch, smartphone, car, etc.) or close to a certain friend, public bus, food truck, artist, or similar element. Services with these constraints can be tied to transaction verification services where the services are purchased, and the constraints enforced for the use of the service.

Relative position-verification can be used in support of services and transactions. The relative position verification process can be implemented by letting the devices (e.g., user, merchant, and other devices) communicate/synchronize over Bluetooth or similar technologies. However, the problem is that these technologies are inherently device centric and hence under control of the user. The transaction verification services encompass location verification in an infrastructure-controlled location code transmission, which requires the participating devices to get that location code to be able to perform the service. The process of the transaction verification service can still be automatic without the user's active involvement (e.g., receiving a code to be inserted into another device, etc.). The same general process and infrastructure is used for both absolute and relative position verification, and the choice of transmitters determines how close the devices need to be (e.g., a certain city, or the same room) for the verification. By letting the location verification be infrastructure controlled, the embodiments guarantee that the proximity (absolute, relative, or both) is at a specific time. To ensure location and transaction verification is secure, the verification that the devices have been in the proximity at an earlier point or will be in proximity at a later time is insufficient. The temporal aspect of transaction and location verification is controlled by the age and validity of the location codes being transmitted and needed to decrypt and/or authenticate transactions.

The transmitters that are utilized by the transaction verification service can have a function enabling the edgecloud transaction verification service to command it to transmit the location code in a timely manner. For relative position verification, a participating device must have such functionality to enable the transaction verification service to direct the sending of location code, which can involve obtaining approval or consent from the owner/user of that participating device. After the participating device receives the location code, verifying the location code by the transaction verification service correlates the location code sent from the at least one transmitter with the one reported by the participating device as well as the location code reported by the primary user device.

Figure 5:
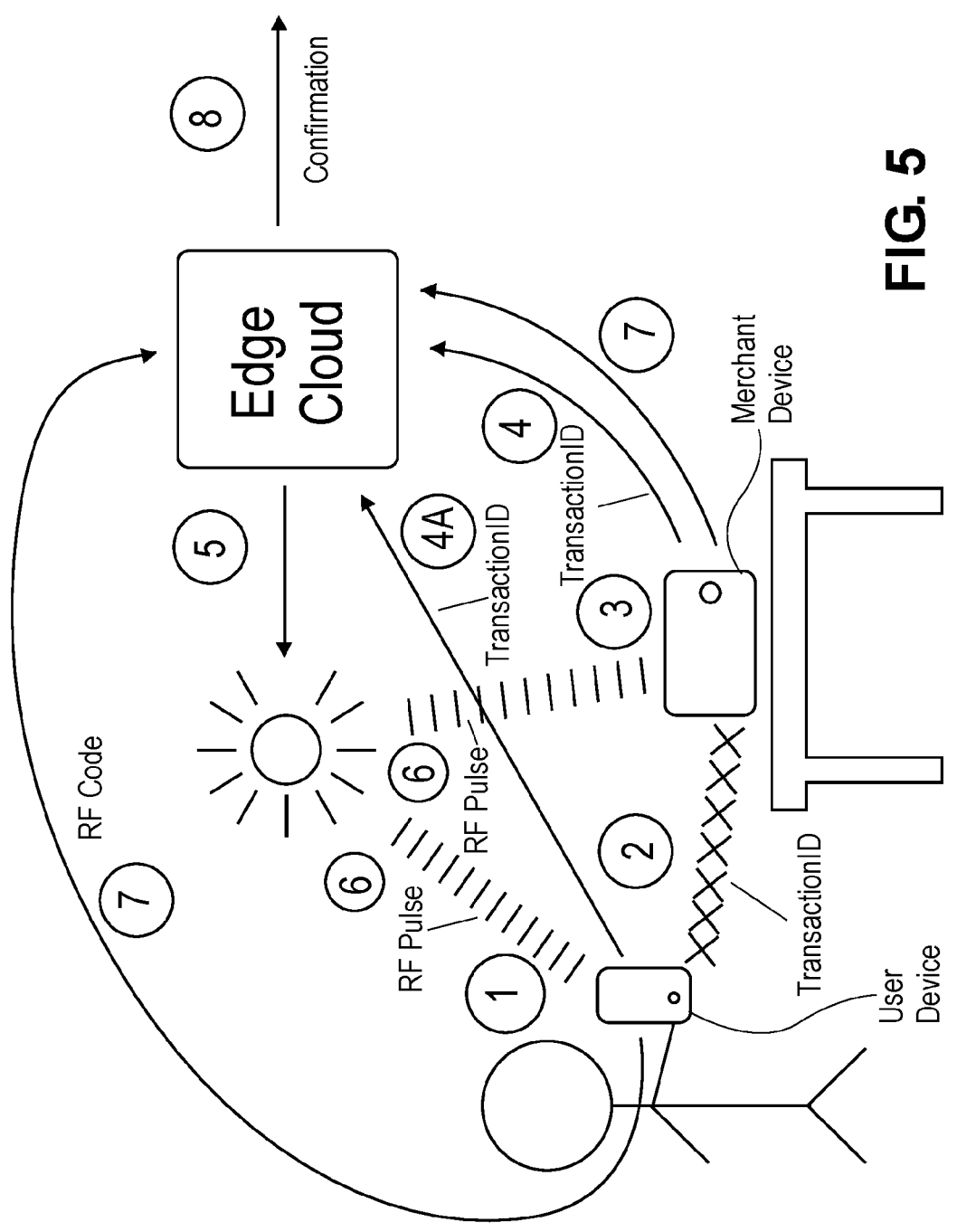
FIG. 5 is a diagram of one embodiment of an example application of the transaction verification service.
Figure 6:
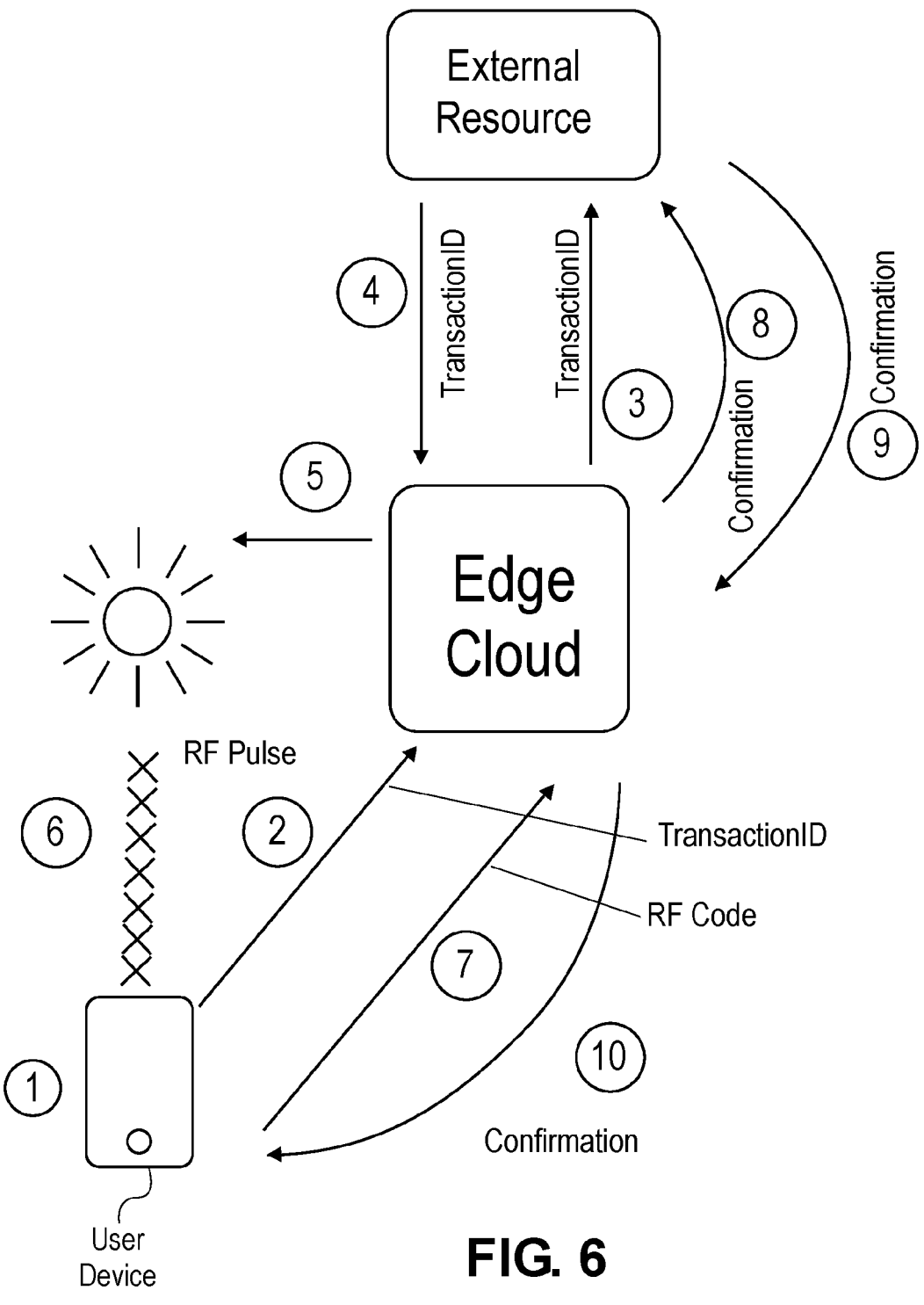
FIG. 6 is a diagram of another embodiment of an example application of the transaction verification service.

FIGS. 5 and 6 are diagrams of example uses of the transaction verification service. These figures provide an example where location verification is adjacent to a merchant's point of sale and the example of mobile payment verification. These are illustrative use cases, and the transaction verification service is not limited to these cases. Any user interface that allows users, applications, or services to begin the verification process on the user device can be utilized.

FIG. 5 is a diagram of one example embodiment of a near-field transaction. In this example, the transaction verification service verifies location of a user device for purposes of nearfield transactions, such as RFID purchases. In FIG. 5, an end user attempting to make a purchase using a nearfield digital wallet is verified using RF pulses prior to the transaction being authorized. In some embodiments, one or more communications between the transaction verification service and the user device and/or the merchant device can be transmitted via one or more base stations.

The end user attempts to make a payment using a digital wallet, RFID payment, or contactless credit card at step (1). In step (2), information about the payment method is sent from the user device to the merchant's device. This information can include a TransactionID or similar information. In step (3), the merchant's device processes the payment information to determine whether the payment method can be accepted and can generate a TransactionID if not provided by the user device. In step (4), the merchant device forwards, e.g., via a base station, the TransactionID to the transaction verification service at the edgecloud. Step (4A) shows an alternate flow when merchants' devices are unavailable, and the digital wallet on the user device creates a TransactionID that is then sent to the edgecloud, e.g., via a base station, without being forwarded by a merchant device. In step (5), the edgecloud requests nearby base stations to send a location code (e.g., an RF signal) to the user device and merchant device. These location codes are then sent by the transmitter and received by the device(s) in step (6). The user device, the merchant device, or both then return, e.g., via one or more base stations, the location code to the transaction verification service at the edgecloud in step (7). The location verified payment information is then forwarded from the location verification system at the edgecloud to third parties in step (8).

FIG. 6 is a diagram of one embodiment of a transaction verification service utilized in a digital payment process. In this embodiment, the transaction verification service verifies the location of a user device when payments are made without a merchant's device being present. In this example, a user device attempts to make a contactless payment via a digital wallet in order to acquire a product or service. In some embodiments, one or more communications between the transaction verification service and the user device can be transmitted via one or more base stations.

In step (1), an end user attempts to make a payment using a digital wallet, RFID payment, or contactless credit card via their user device. In step (2), information about the payment method is sent by the user device, e.g., via a base station, to the transaction verification service at the edgecloud via a TransactionID or similar information. In step (3), the location verification service at the edgecloud forwards the TransactionID to a third-party external resource, such as an application programming interface (API) such as a payment processor. In step (4), the third-party resource forwards the TransactionID back to the edgecloud if the purchase is approved to go forward. This may involve a check of the credit limit or similar considerations for the transaction. In step (5), the transaction verification service at the edgecloud requests nearby base stations to send a location code (e.g., an RF signal) to the user device and any nearby devices that may be used for relative position verification. These locations codes are then sent by the transmitter and received by the device(s) in step (6). The user device and any other participating devices then returns the location code, e.g., via one or more base stations, to the transaction verification service at the edgecloud in step (7). The location code that is sent via the transmitter to the participating devices and the user device can be selected and tracked by the transaction verification service, known to the transaction verification service based on a scheme of location code correlations to transmitters and/or geo-referenced areas (e.g., a fixed correlation between the transmitter and a location code or a deterministic changing of location codes per transmitter and/or geo-referenced area over time), or by similar location code sharing or determination mechanisms. In embodiments where the transaction verification services execute at the edge cloud, the instances of the transaction verification service co-located with a transmitter have knowledge of the correlated location code. In embodiments where the transaction verification services execute remote from the transmitters, the transaction verification services have knowledge of the location code scheme or can obtain the location code from the transmitters or other tracking source. In further embodiments, the transaction verification services can dynamically generate or participate in the dynamic generation of location code (e.g., per verification or time period) and share the location codes with the transmitters when a request is made to transmit the location code or at the time of dynamic generation. If the location code matches the location code sent to the user device, then the transaction verification service at the edgecloud generates a confirmation code that is forwarded to the third-party external resource at step (8). After processing, the acceptance of the confirmation is sent back to the edgecloud at step (9) and the confirmation of purchase is returned, e.g., via a base station, to the user device at step (10).

When there are multiple transmitters (e.g., local RF transmitters) in the vicinity of the user device, the transaction verification service can take advantage of them to further enhance the robustness of location verification. An example case is when a local transmitter is compromised and relying on that single transmitter may lead to the failure of location verification. In other examples, a single transmitter cannot reach a user device at a given time instance (e.g., because of radio shadowing). In these cases, multiple local transmitters can be used simultaneously to distribute the location code to the user device. In the examples of multiple local transmitters, the distribution of the location code can be further optimized by, for instance, sending part of the location code from each transmitter and combining the portions of the location code in the user device. In another embodiment, redundant keys from multiple transmitters can be sent, and a check made if they all match.

Figure 7:
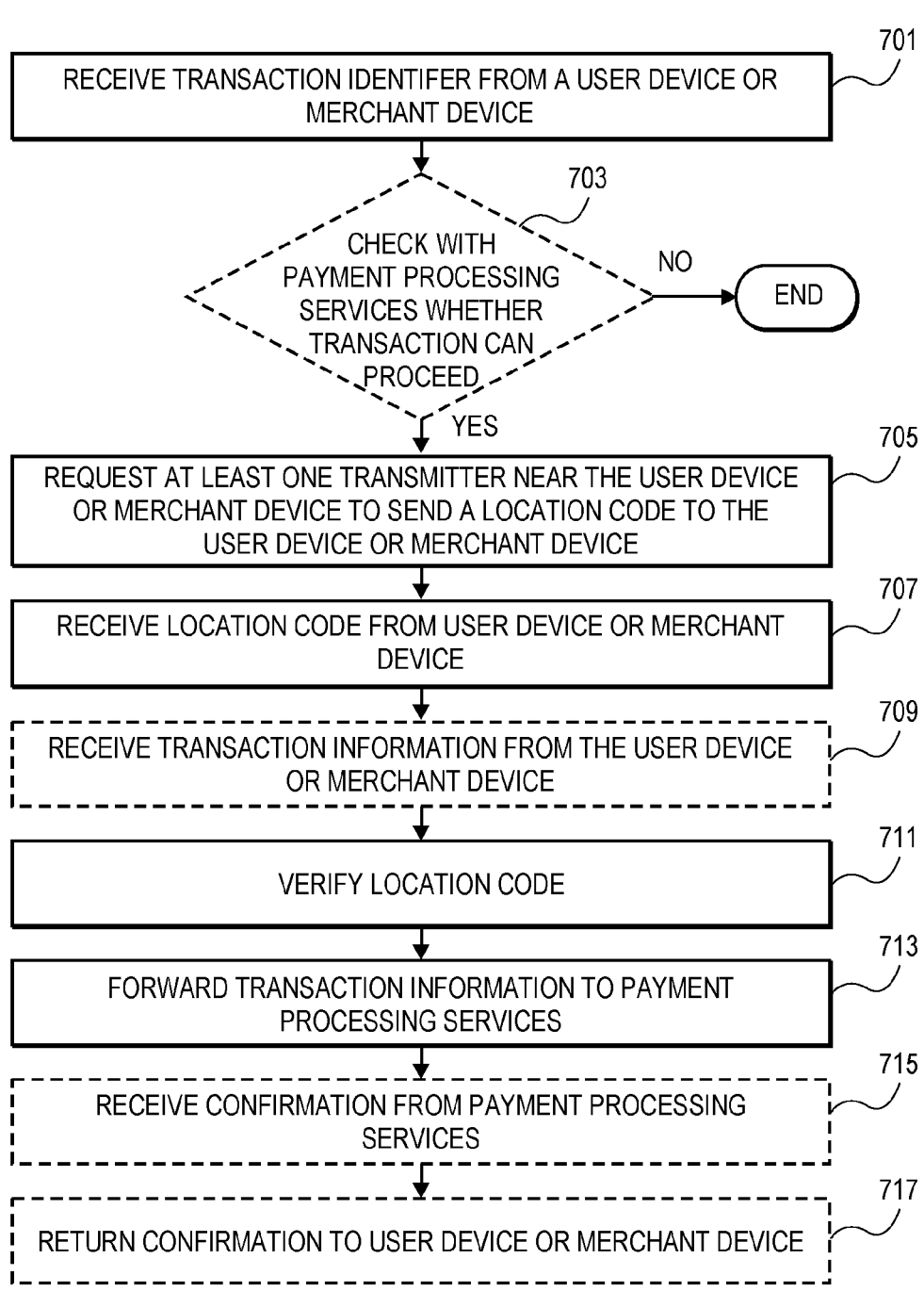
FIG. 7 is a flowchart of one embodiment of a process of the transaction verification service implemented by an electronic device in the edgecloud.

FIG. 7 is a flowchart of one embodiment of an operation of the transaction verification service at the edgecloud. In some embodiments, one or more communications between the transaction verification service and the user device and/or the merchant device can be transmitted via one or more base stations. The process is initiated where the transaction verification service receives a request, e.g., via a base station, in the form of a transaction identifier (TransactionID) or similar format of transaction request from the user device or merchant device (Block 701). The transaction verification service can check with a payment processing service whether the process can proceed (Block 703). If the payment processing services approve of the transaction, for example, with a notice returned to the transaction verification service, then the transaction verification service can proceed. If the payment processing service does not approve, then the transaction verification service can be notified of the denial, which can end the process. The transaction verification service can send a denial notification or similar response to the user device and any participating devices such as the merchant device.

In some embodiments, the transaction verification service can check whether the user device is previously verified at the location identified by the request and that the previous verification occurred within a pre-defined threshold timeframe, in which case the transaction can be verified without the full verification process. A verified transaction can cause the transaction verification service to notify the user device, merchant device, payment processor and similar entities in the transaction. If the user device has not been previously verified, then the process can check whether the location identified in the received verification request (e.g., a geo-referenced area) is known to the transaction verification service at the edgecloud.

If the location is not known or the process is going to re-verify the user device location for this transaction, then the transaction verification service determines which transmitters are available in the location. This can be done by requesting information on transmitters in the location near the user device or merchant device from the mobile network resources, the transmitters, other transaction verification service instances, or similar resources. The transaction verification service then compiles the list of transmitters and the characteristics of those transmitters. The characteristics of the transmitters can include range, protocols, transactions, and similar characteristics of the transmitters. The listing of transmitters can then be stored in a local cache such that it does not have to request and receive the information again. In some embodiments, the transaction verification service can periodically and/or asynchronously update or maintain the transmitter information for each geo-referenced area or frequently accessed geo-referenced areas. Once the list of available transmitters is assembled, then the process can select at least one transmitter to utilize to send a location code to the user device. The transmitter can be selected based on its characteristics such as range and/or technologies supported. For example, the process can select the transmitter that is closest to the merchant device or POP, smallest range, and a transmission technology that is supported by the user device to maximize the proximity and accuracy of the verification.

The transaction verification service can instruct a selected set of transmitters (e.g., at least one) to send a location code to the user device or merchant device (Block 705). The location code can be any type of unique identifier, key, token, or similar element that is encrypted or unencrypted that is correlated with the geo-referenced area or location. The target devices (e.g., the user device and/or merchant device) can be sent a notification of the technology, protocols, or similar characteristics of the transmission of the location code that are to be utilized by the selected transmitters such that the user device or merchant device can receive and derive the location code.

The transaction verification service then awaits the receipt, e.g., via one or more base stations, of a location code from the user device or merchant device or both (Block 707). If the user device and/or merchant device successfully receive and decode the location code, then the user device and/or merchant device will return the location code to enable verification of their location in the area identified in the initial request. In some embodiments, additional transaction information can be provided to support the verification process or to be sent in support of the transaction to the payment processing service, via one or more base stations, from the user device, merchant device, or both (Block 709). The location code that is sent via the transmitter to the merchant device and the user device can be selected and tracked by the transaction verification service, known to the transaction verification service based on a scheme of location code correlations to transmitters and/or geo-referenced areas (e.g., a fixed correlation between the transmitter and a location code or a deterministic changing of location codes per transmitter and/or geo-referenced area over time), or by similar location code sharing or determination mechanisms. In embodiments where the transaction verification services execute at the edge cloud, the instances of the transaction verification service co-located with a transmitter have knowledge of the correlated location code. In embodiments where the transaction verification services execute remote from the transmitters, the transaction verification services have knowledge of the location code scheme or can obtain the location code from the transmitters or other tracking source. In further embodiments, the transaction verification services can dynamically generate or participate in the dynamic generation of location code (e.g., per verification or time period) and share the location codes with the transmitters when a request is made to transmit the location code or at the time of dynamic generation. The received location codes are matched against the location codes that were sent to the user device and/or the merchant device (Block 711). Where the codes match, the transaction can be verified as occurring in the target location (i.e., that the user device and/or the merchant device are in the target location). If the location codes match, then the transaction is verified by the transaction verification service and transaction information (e.g., the transaction identifier) can be forwarded to the payment processing service (Block 713). The payment processing service (e.g., a Visa or Mastercard type payment processing service) can confirm other aspects of the transaction to approve or deny the transaction. The payment processing services can take any aspect of the transaction into account including credit limits, balances, location, merchant, credit ratings, and similar characteristics of the transactions. The payment processing services can also apply traditional fraud detection processes.

If the transaction is approved by the payment processing service, then a confirmation is sent to and received by the transaction verification service (Block 715). The confirmation can be an approval or denial notification. The confirmation can then be returned to the participating devices, the user device and/or merchant device (Block 717), and then these devices can complete the transaction or abort the transaction depending on whether the confirmation is an approval or denial.

Thus, the embodiments provide a transaction verification service that has the ability for transmitters to distribute location codes via pulses that are needed to verify user device location for purposes of making contactless payments. The embodiments provide the ability to use available services or merchant device to define geo-referenced areas into which user device locations are verified for purposes of making contactless payments. Transmitters can distribute location codes to multiple devices simultaneously for purposes of location verification. This also reduces the latency of location verification for purposes of contactless payment verification. Signals sent from multiple transmitters can increase the trust in and precision of the location of a particular user device for purposes of making contactless payments. The embodiments have the capability to use location codes (e.g., RF signal) to verify user device location for purposes of verifying contactless payment methods associated with the user device. The embodiments use location codes to verify user device location to access paid-for services within a given environment. Some embodiments perform location verification using broadcast key distribution without requiring individual devices to perform handshaking for purposes of making a contactless payment. The embodiments use location codes to perform location verification for a specific geographical area as well as an area at a specific other device as well as a combination of the two.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 8:
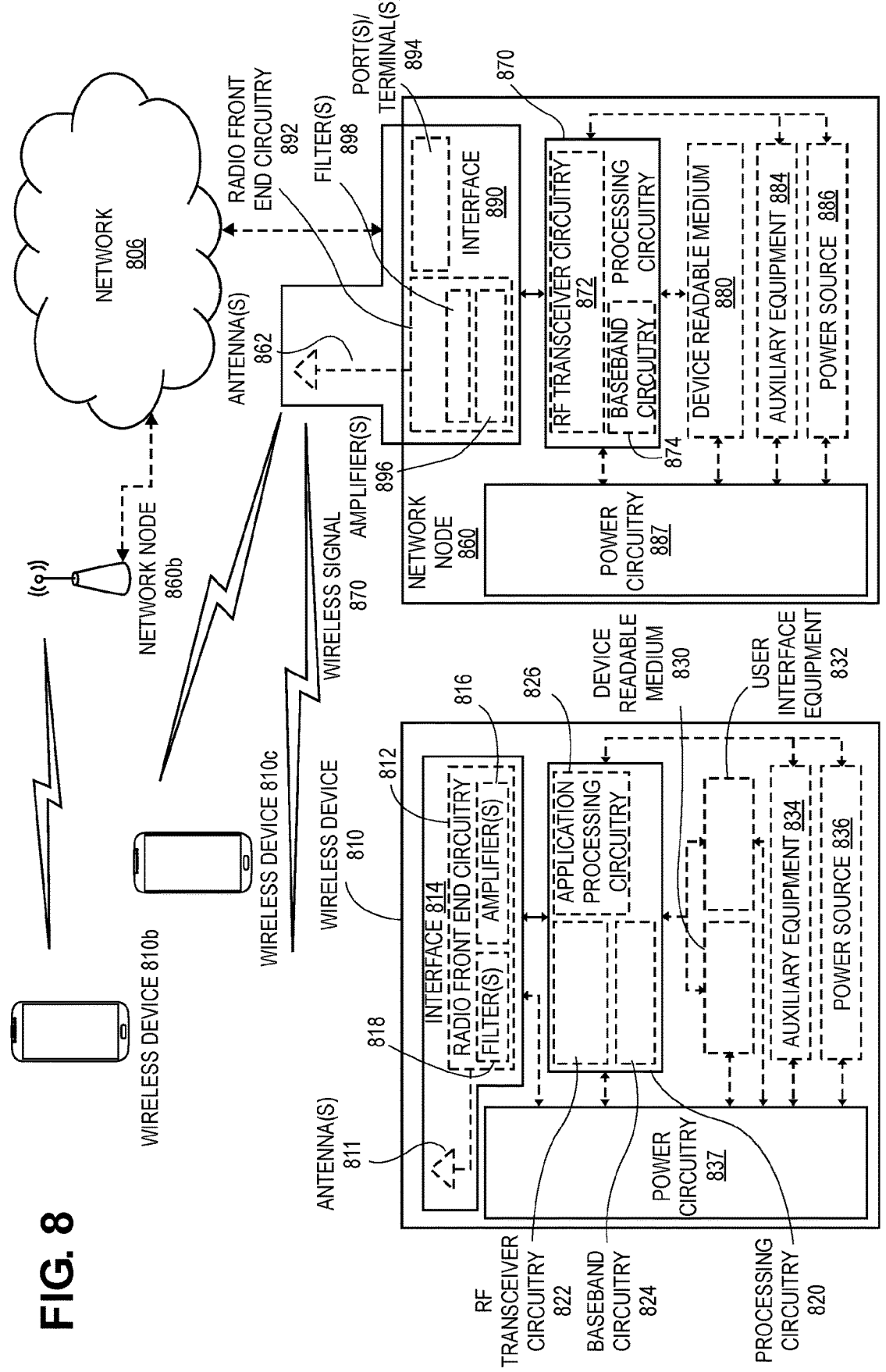
FIG. 8 is a diagram of one embodiment of a wireless network for supporting transaction verification services.

FIG. 8 is a diagram of one embodiment of a wireless network in accordance with some embodiments to provide transaction verification services and related functions. Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network, or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and an RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, Wi-Fi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part, or all of RF transceiver circuitry 872 and baseband processing circuitry 874 may be on the same chip or set of chips, boards, or units.

In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860 but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

The device readable medium 880 can include code implementing transaction verification services and related functions as described herein. The transaction verification services and related functions can be executed by the processing circuitry 870. The transaction verification services and related functions can have any organization, range of functions, and variety of components in support of the transaction verification service functions as described herein. In this embodiment, the transaction verification services and related functions are shown as software or a subsystem at the network node 860 (e.g., at a basestation). The transaction verification services and related functions can be distributed over any number of network nodes serving many user devices and services, the transaction verification services and related functions can also be implemented in central cloud systems or other similar central compute systems and any combinations thereof. The functions of the transaction verification services can serve any number and variety of different wireless devices 810, and similar devices. The transaction verification services and related functions can be utilized and executed in other contexts such as in combination with the other processes and features as described herein.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all, or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node, and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node, and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 810, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, Wi-Fi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send, and/or receive wireless signals, and is connected to interface 810. In certain alternative embodiments, antenna 811 may be separate from WD 810 and be connectable to WD 810 through an interface or port. Antenna 811, interface 810, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 810 comprises radio front end circuitry 812 and antenna 811. Radio front end circuitry 812 comprise one or more filters 818 and amplifiers 816. Radio front end circuitry 810 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some, or all of RF transceiver circuitry 822 may be considered a part of interface 810. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part, or all of baseband processing circuitry 824 and application processing circuitry 826 may be combined into one chip or set of chips, and RF transceiver circuitry 822 may be on a separate chip or set of chips. In still alternative embodiments, part, or all of RF transceiver circuitry 822 and baseband processing circuitry 824 may be on the same chip or set of chips, and application processing circuitry 826 may be on a separate chip or set of chips. In yet other alternative embodiments, part, or all of RF transceiver circuitry 822, baseband processing circuitry 824, and application processing circuitry 826 may be combined in the same chip or set of chips. In some embodiments, RF transceiver circuitry 822 may be a part of interface 810. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices, and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario. Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
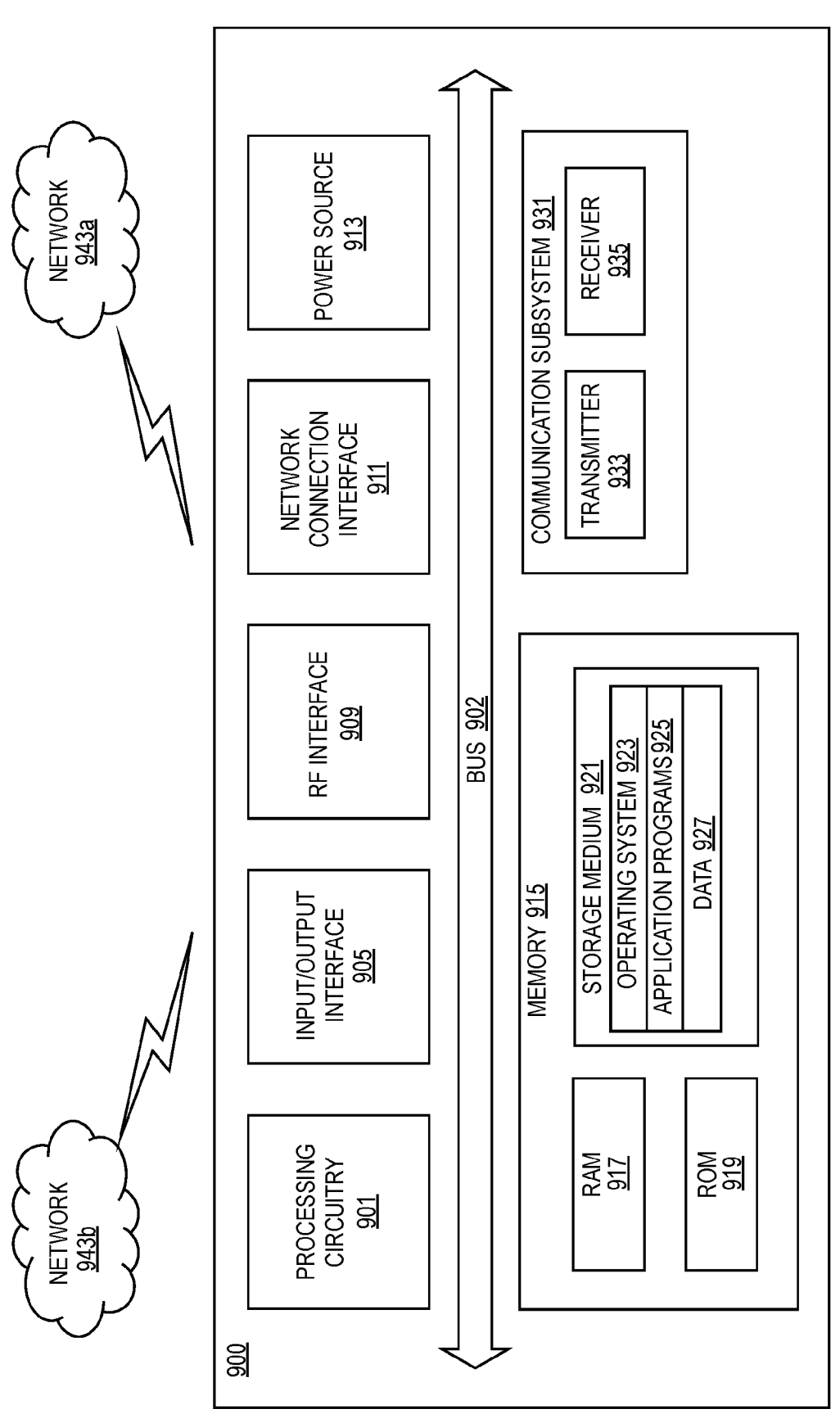
FIG. 9 is a diagram of one embodiment of user equipment for supporting transaction verification services.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 9200 may be any UE identified by the 3$^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, global positioning service sensor, and an optical sensor.

In FIG. 9, RF interface 909 may be configured to provide a communication interface to RF components such as a transmitter, a receiver, and an antenna. Network connection interface 911 may be configured to provide a communication interface to network 943*a* Network 943*a* may encompass wired and/or wireless networks such as a local-area network (LAN), a wide-area network (WAN), a computer network, a wireless network, a telecommunications network, another like network or any combination thereof. For example, network 943*a* may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software, or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMAX, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software, or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power source 99 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software, or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
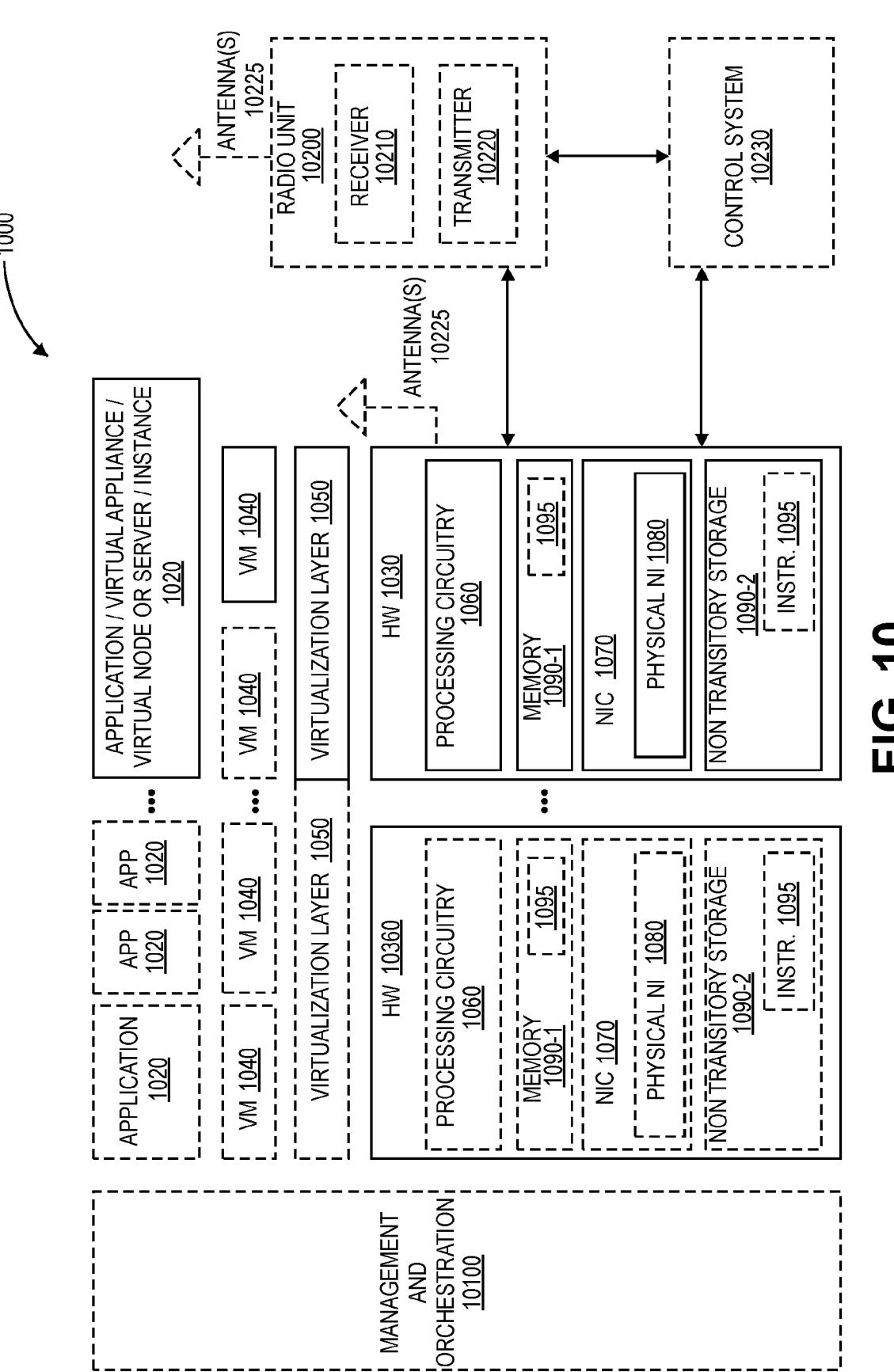
FIG. 10 is a diagram of one embodiment of a virtualization environment for supporting transaction verification services.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g., such as in a data center or customer premise equipment (CPE)) where many hardware nodes work together and are managed via management and orchestration (MANO) 10140, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be affected with the use of control system 10230 which may alternatively be used for communication between the hardware nodes 1030 and radio units 10200.

FIG. 11A illustrates connectivity between network devices (NDs) within an exemplary network, as well as three exemplary implementations of the NDs, according to some embodiments of the invention. FIG. 11A shows NDs 1100A-H, and their connectivity by way of lines between 1100A-1100B, 1100B-1100C, 1100C-1100D, 1100D-1100E, 1100E-1100F, 1100F-1100G, and 1100A-1100G, as well as between 1100H and each of 1100A, 1100C, 1100D, and 1100G. These NDs are physical devices, and the connectivity between these NDs can be wireless or wired (often referred to as a link). An additional line extending from NDs 1100A, 1100E, and 1100F illustrates that these NDs act as ingress and egress points for the network (and thus, these NDs are sometimes referred to as edge NDs; while the other NDs may be called core NDs).

Two of the exemplary ND implementations in FIG. 11A are: 1) a special-purpose network device 1102 that uses custom application-specific integrated-circuits (ASICs) and a special-purpose operating system (OS); and 2) a general purpose network device 1104 that uses common off-the-shelf (COTS) processors and a standard OS.

The special-purpose network device 1102 includes networking hardware 1110 comprising a set of one or more processor(s) 1112, forwarding resource(s) 1114 (which typically include one or more ASICs and/or network processors), and physical network interfaces (NIs) 1116 (through which network connections are made, such as those shown by the connectivity between NDs 1100A-H), as well as non-transitory machine readable storage media 1118 having stored therein networking software 1120. During operation, the networking software 1120 may be executed by the networking hardware 1110 to instantiate a set of one or more networking software instance(s) 1122. Each of the networking software instance(s) 1122, and that part of the networking hardware 1110 that executes that network software instance (be it hardware dedicated to that networking software instance and/or time slices of hardware temporally shared by that networking software instance with others of the networking software instance(s) 1122), form a separate virtual network element 1130A-R. Each of the virtual network element(s) (VNEs) 1130A-R includes a control communication and configuration module 1132A-R (sometimes referred to as a local control module or control communication module) and forwarding table(s) 1134A-R, such that a given virtual network element (e.g., 1130A) includes the control communication and configuration module (e.g., 1132A), a set of one or more forwarding table(s) (e.g., 1134A), and that portion of the networking hardware 1110 that executes the virtual network element (e.g., 1130A).

The networking software 1120 can include the transaction verification service 1181, which implements the processes for transaction processing as described herein.

The special-purpose network device 1102 is often physically and/or logically considered to include: 1) a ND control plane 1124 (sometimes referred to as a control plane) comprising the processor(s) 1112 that execute the control communication and configuration module(s) 1132A-R; and 2) a ND forwarding plane 1126 (sometimes referred to as a forwarding plane, a data plane, or a media plane) comprising the forwarding resource(s) 1114 that utilize the forwarding table(s) 1134A-R and the physical NIs 1116. By way of example, where the ND is a router (or is implementing routing functionality), the ND control plane 1124 (the processor(s) 1112 executing the control communication and configuration module(s) 1132A-R) is typically responsible for participating in controlling how data (e.g., packets) is to be routed (e.g., the next hop for the data and the outgoing physical NI for that data) and storing that routing information in the forwarding table(s) 1134A-R, and the ND forwarding plane 1126 is responsible for receiving that data on the physical NIs 1116 and forwarding that data out the appropriate ones of the physical NIs 1116 based on the forwarding table(s) 1134A-R.

FIG. 11B illustrates an exemplary way to implement the special-purpose network device 1102 according to some embodiments of the invention. FIG. 11B shows a special-purpose network device including cards 1138 (typically hot pluggable). While in some embodiments the cards 1138 are of two types (one or more that operate as the ND forwarding plane 1126 (sometimes called line cards), and one or more that operate to implement the ND control plane 1124 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1136 (e.g., a first full mesh coupling the line cards and a second full mesh coupling all of the cards).

Returning to FIG. 11A, the general purpose network device 1104 includes hardware 1140 comprising a set of one or more processor(s) 1142 (which are often COTS processors) and physical NIs 1146, as well as non-transitory machine readable storage media 1148 having stored therein software 1150. During operation, the processor(s) 1142 execute the software 1150 to instantiate one or more sets of one or more applications 1164A-R. While one embodiment does not implement virtualization, alternative embodiments may use different forms of virtualization. For example, in one such alternative embodiment the virtualization layer 1154 represents the kernel of an operating system (or a shim executing on a base operating system) that allows for the creation of multiple instances 1162A-R called software containers that may each be used to execute one (or more) of the sets of applications 1164A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1154 represents a hypervisor (sometimes referred to as a virtual machine monitor (VMM)) or a hypervisor executing on top of a host operating system, and each of the sets of applications 1164A-R is run on top of a guest operating system within an instance 1162A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1140, directly on a hypervisor (in which case the unikernel is sometimes described as running within a LibOS virtual machine), or in a software container, embodiments can be implemented fully with unikernels running directly on a hypervisor represented by virtualization layer 1154, unikernels running within software containers represented by instances 1162A-R, or as a combination of unikernels and the above-described techniques (e.g., unikernels and virtual machines both run directly on a hypervisor, unikernels and sets of applications that are run in different software containers).

The software 1150 can include the transaction verification service 1181, which implements the processes for transaction processing as described herein.

The instantiation of the one or more sets of one or more applications 1164A-R, as well as virtualization if implemented, are collectively referred to as software instance(s) 1152. Each set of applications 1164A-R, corresponding virtualization construct (e.g., instance 1162A-R) if implemented, and that part of the hardware 1140 that executes them (be it hardware dedicated to that execution and/or time slices of hardware temporally shared), forms a separate virtual network element(s) 1160A-R.

The virtual network element(s) 1160A-R perform similar functionality to the virtual network element(s) 1130A-R—e.g., similar to the control communication and configuration module(s) 1132A and forwarding table(s) 1134A (this virtualization of the hardware 1140 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1162A-R corresponding to one VNE 1160A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1162A-R to VNEs also apply to embodiments where such a finer level of granularity and/or unikernels are used.

In certain embodiments, the virtualization layer 1154 includes a virtual switch that provides similar forwarding services as a physical Ethernet switch. Specifically, this virtual switch forwards traffic between instances 1162A-R and the physical NI(s) 1146, as well as optionally between the instances 1162A-R; in addition, this virtual switch may enforce network isolation between the VNEs 1160A-R that by policy are not permitted to communicate with each other (e.g., by honoring virtual local area networks (VLANs)).

The third exemplary ND implementation in FIG. 11A is a hybrid network device 1106, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1102) could provide for para-virtualization to the networking hardware present in the hybrid network device 1106.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 1130A-R, VNEs 1160A-R, and those in the hybrid network device 1106) receives data on the physical NIs (e.g., 1116, 1146) and forwards that data out the appropriate ones of the physical NIs (e.g., 1116, 1146). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 11C illustrates various exemplary ways in which VNEs may be coupled according to some embodiments of the invention. FIG. 11C shows VNEs 1170A.1-1170A.P (and optionally VNEs 1170A.Q-1170A.R) implemented in ND 1100A and VNE 1170H.1 in ND 1100H. In FIG. 11C, VNEs 1170A.1-P are separate from each other in the sense that they can receive packets from outside ND 1100A and forward packets outside of ND 1100A; VNE 1170A.1 is coupled with VNE 1170H.1, and thus they communicate packets between their respective NDs; VNE 1170A.2-1170A.3 may optionally forward packets between themselves without forwarding them outside of the ND 1100A; and VNE 1170A.P may optionally be the first in a chain of VNEs that includes VNE 1170A.Q followed by VNE 1170A.R (this is sometimes referred to as dynamic service chaining, where each of the VNEs in the series of VNEs provides a different service—e.g., one or more layer 4-7 network services). While FIG. 11C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 11A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 11A may also host one or more such servers (e.g., in the case of the general purpose network device 1104, one or more of the software instances 1162A-R may operate as servers; the same would be true for the hybrid network device 1106; in the case of the special-purpose network device 1102, one or more such servers could also be run on a virtualization layer executed by the processor(s) 1112); in which case the servers are said to be co-located with the VNEs of that ND.

A virtual network is a logical abstraction of a physical network (such as that in FIG. 11A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 11D illustrates a network with a single network element on each of the NDs of FIG. 11A, and within this straightforward approach contrasts a traditional distributed approach (commonly used by traditional routers) with a centralized approach for maintaining reachability and forwarding information (also called network control), according to some embodiments of the invention. Specifically, FIG. 11D illustrates network elements (NEs) 1170A-H with the same connectivity as the NDs 1100A-H of FIG. 11A.

FIG. 11D illustrates that the distributed approach 1172 distributes responsibility for generating the reachability and forwarding information across the NEs 1170A-H; in other words, the process of neighbor discovery and topology discovery is distributed.

For example, where the special-purpose network device 1102 is used, the control communication and configuration module(s) 1132A-R of the ND control plane 1124 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1170A-H (e.g., the processor(s) 1112 executing the control communication and configuration module(s) 1132A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1124. The ND control plane 1124 programs the ND forwarding plane 1126 with information (e.g., adjacency and route information) based on the routing structure(s). For example, the ND control plane 1124 programs the adjacency and route information into one or more forwarding table(s) 1134A-R (e.g., Forwarding Information Base (FIB), Label Forwarding Information Base (LFIB), and one or more adjacency structures) on the ND forwarding plane 1126. For layer 2 forwarding, the ND can store one or more bridging tables that are used to forward data based on the layer 2 information in that data. While the above example uses the special-purpose network device 1102, the same distributed approach 1172 can be implemented on the general purpose network device 1104 and the hybrid network device 1106.

FIG. 11D illustrates that a centralized approach 1174 (also known as software defined networking (SDN)) that decouples the system that makes decisions about where traffic is sent from the underlying systems that forwards traffic to the selected destination. The illustrated centralized approach 1174 has the responsibility for the generation of reachability and forwarding information in a centralized control plane 1176 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1176 has a south bound interface 1182 with a data plane 1180 (sometime referred to the infrastructure layer, network forwarding plane, or forwarding plane (which should not be confused with a ND forwarding plane)) that includes the NEs 1170A-H (sometimes referred to as switches, forwarding elements, data plane elements, or nodes). The centralized control plane 1176 includes a network controller 1178, which includes a centralized reachability and forwarding information module 1179 that determines the reachability within the network and distributes the forwarding information to the NEs 1170A-H of the data plane 1180 over the south bound interface 1182 (which may use the OpenFlow protocol). Thus, the network intelligence is centralized in the centralized control plane 1176 executing on electronic devices that are typically separate from the NDs.

For example, where the special-purpose network device 1102 is used in the data plane 1180, each of the control communication and configuration module(s) 1132A-R of the ND control plane 1124 typically include a control agent that provides the VNE side of the south bound interface 1182. In this case, the ND control plane 1124 (the processor(s) 1112 executing the control communication and configuration module(s) 1132A-R) performs its responsibility for participating in controlling how data (e.g., packets) is to be routed (e.g., the next hop for the data and the outgoing physical NI for that data) through the control agent communicating with the centralized control plane 1176 to receive the forwarding information (and in some cases, the reachability information) from the centralized reachability and forwarding information module 1179 (it should be understood that in some embodiments of the invention, the control communication and configuration module(s) 1132A-R, in addition to communicating with the centralized control plane 1176, may also play some role in determining reachability and/or calculating forwarding information—albeit less so than in the case of a distributed approach; such embodiments are generally considered to fall under the centralized approach 1174, but may also be considered a hybrid approach).

While the above example uses the special-purpose network device 1102, the same centralized approach 1174 can be implemented with the general purpose network device 1104 (e.g., each of the VNE 1160A-R performs its responsibility for controlling how data (e.g., packets) is to be routed (e.g., the next hop for the data and the outgoing physical NI for that data) by communicating with the centralized control plane 1176 to receive the forwarding information (and in some cases, the reachability information) from the centralized reachability and forwarding information module 1179; it should be understood that in some embodiments of the invention, the VNEs 1160A-R, in addition to communicating with the centralized control plane 1176, may also play some role in determining reachability and/or calculating forwarding information—albeit less so than in the case of a distributed approach) and the hybrid network device 1106. In fact, the use of SDN techniques can enhance the NFV techniques typically used in the general purpose network device 1104 or hybrid network device 1106 implementations as NFV is able to support SDN by providing an infrastructure upon which the SDN software can be run, and NFV and SDN both aim to make use of commodity server hardware and physical switches.

The centralized control plane 1176 can include the transaction verification service 1181, which implements the processes for transaction processing as described herein at a network controller 1178 or similar location in the centralized approach 1174.

FIG. 11D also shows that the centralized control plane 1176 has a north bound interface 1184 to an application layer 1186, in which resides application(s) 1188. The centralized control plane 1176 has the ability to form virtual networks 1192 (sometimes referred to as a logical forwarding plane, network services, or overlay networks (with the NEs 1170A-H of the data plane 1180 being the underlay network)) for the application(s) 1188. Thus, the centralized control plane 1176 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 11D shows the distributed approach 1172 separate from the centralized approach 1174, the effort of network control may be distributed differently or the two combined in certain embodiments of the invention. For example: 1) embodiments may generally use the centralized approach (SDN) 1174, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1174 but may also be considered a hybrid approach.

While FIG. 11D illustrates the simple case where each of the NDs 1100A-H implements a single NE 1170A-H, it should be understood that the network control approaches described with reference to FIG. 11D also work for networks where one or more of the NDs 1100A-H implement multiple VNEs (e.g., VNEs 1130A-R, VNEs 1160A-R, those in the hybrid network device 1106). Alternatively, or in addition, the network controller 1178 may also emulate the implementation of multiple VNEs in a single ND. Specifically, instead of (or in addition to) implementing multiple VNEs in a single ND, the network controller 1178 may present the implementation of a VNE/NE in a single ND as multiple VNEs in the virtual networks 1192 (all in the same one of the virtual network(s) 1192, each in different ones of the virtual network(s) 1192, or some combination). For example, the network controller 1178 may cause an ND to implement a single VNE (a NE) in the underlay network, and then logically divide up the resources of that NE within the centralized control plane 1176 to present different VNEs in the virtual network(s) 1192 (where these different VNEs in the overlay networks are sharing the resources of the single VNE/NE implementation on the ND in the underlay network).

On the other hand, FIGS. 11E and 11F respectively illustrate exemplary abstractions of NEs and VNEs that the network controller 1178 may present as part of different ones of the virtual networks 1192. FIG. 11E illustrates the simple case of where each of the NDs 1100A-H implements a single NE 1170A-H (see FIG. 11D), but the centralized control plane 1176 has abstracted multiple of the NEs in different NDs (the NEs 1170A-C and G-H) into (to represent) a single NE 1170I in one of the virtual network(s) 1192 of FIG. 11D, according to some embodiments of the invention. FIG. 11E shows that in this virtual network, the NE 1170I is coupled to NE 1170D and 1170F, which are both still coupled to NE 1170E.

FIG. 11F illustrates a case where multiple VNEs (VNE 1170A.1 and VNE 1170H.1) are implemented on different NDs (ND 1100A and ND 1100H) and are coupled to each other, and where the centralized control plane 1176 has abstracted these multiple VNEs such that they appear as a single VNE 1170T within one of the virtual networks 1192 of FIG. 11D, according to some embodiments of the invention. Thus, the abstraction of a NE or VNE can span multiple NDs.

While some embodiments of the invention implement the centralized control plane 1176 as a single entity (e.g., a single instance of software running on a single electronic device), alternative embodiments may spread the functionality across multiple entities for redundancy and/or scalability purposes (e.g., multiple instances of software running on different electronic devices).

Figure 12:
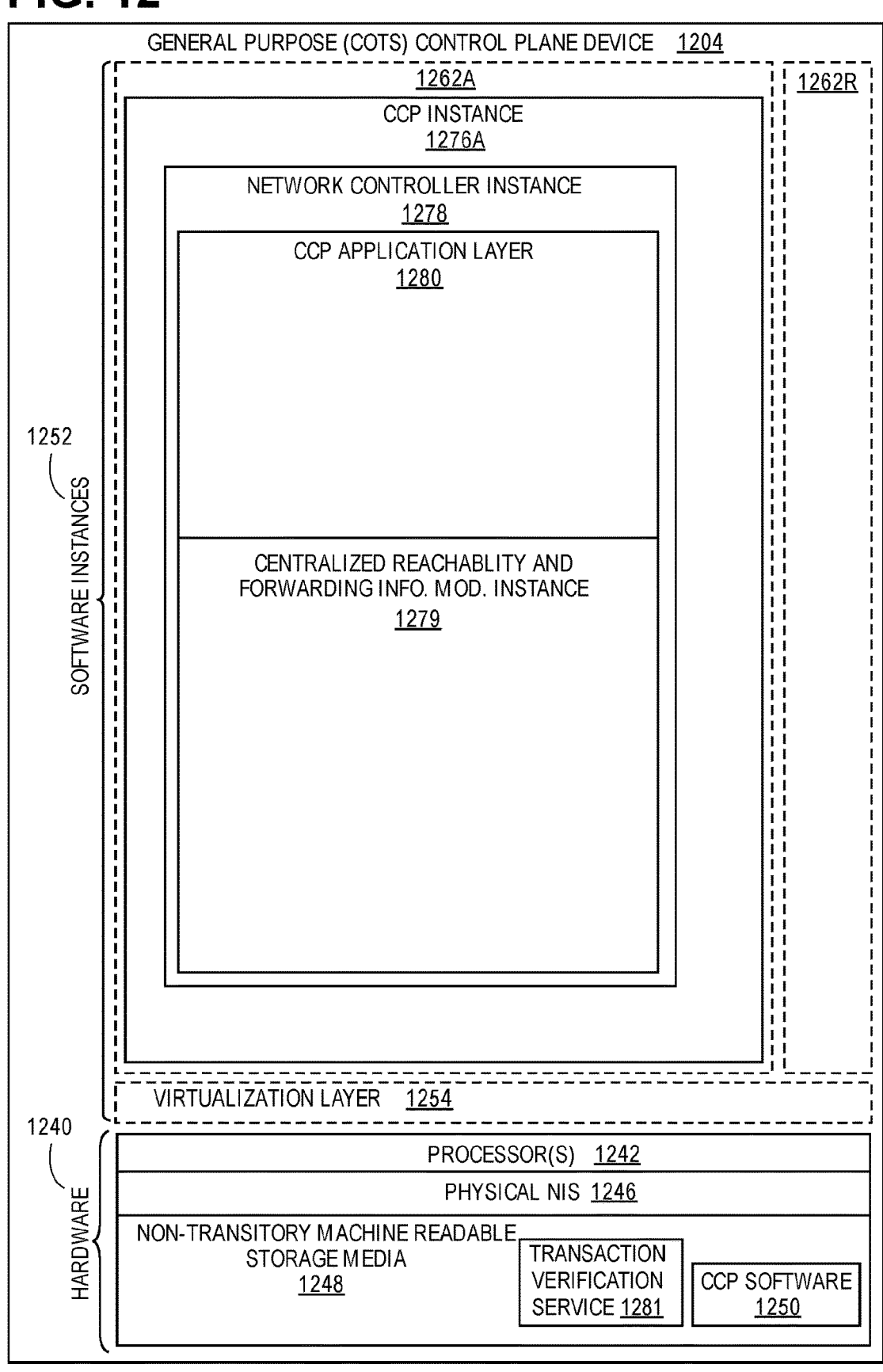
FIG. 12 illustrates a general purpose control plane device with centralized control plane (CCP) software, according to some embodiments of the invention.

Similar to the network device implementations, the electronic device(s) running the centralized control plane 1176, and thus the network controller 1178 including the centralized reachability and forwarding information module 1179, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 12 illustrates, a general purpose control plane device 1204 including hardware 1240 comprising a set of one or more processor(s) 1242 (which are often COTS processors) and physical NIs 1246, as well as non-transitory machine readable storage media 1248 having stored therein centralized control plane (CCP) software 1250.

The non-transitory machine readable storage media 1148 can include the transaction verification service 1281, which when executed by the control plane device 1204 implements the processes for transaction processing as described herein.

In embodiments that use compute virtualization, the processor(s) 1242 typically execute software to instantiate a virtualization layer 1254 (e.g., in one embodiment the virtualization layer 1254 represents the kernel of an operating system (or a shim executing on a base operating system) that allows for the creation of multiple instances 1262A-R called software containers (representing separate user spaces and also called virtualization engines, virtual private servers, or jails) that may each be used to execute a set of one or more applications; in another embodiment the virtualization layer 1254 represents a hypervisor (sometimes referred to as a virtual machine monitor (VMM)) or a hypervisor executing on top of a host operating system, and an application is run on top of a guest operating system within an instance 1262A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1240, directly on a hypervisor represented by virtualization layer 1254 (in which case the unikernel is sometimes described as running within a LibOS virtual machine), or in a software container represented by one of instances 1262A-R). Again, in embodiments where compute virtualization is used, during operation an instance of the CCP software 1250 (illustrated as CCP instance 1276A) is executed (e.g., within the instance 1262A) on the virtualization layer 1254. In embodiments where compute virtualization is not used, the CCP instance 1276A is executed, as a unikernel or on top of a host operating system, on the "bare metal" general purpose control plane device 1204. The instantiation of the CCP instance 1276A, as well as the virtualization layer 1254 and instances 1262A-R if implemented, are collectively referred to as software instance(s) 1252.

In some embodiments, the CCP instance 1276A includes a network controller instance 1278. The network controller instance 1278 includes a centralized reachability and forwarding information module instance 1279 (which is a middleware layer providing the context of the network controller 1178 to the operating system and communicating with the various NEs), and an CCP application layer 1280 (sometimes referred to as an application layer) over the middleware layer (providing the intelligence required for various network operations such as protocols, network situational awareness, and user-interfaces). At a more abstract level, this CCP application layer 1280 within the centralized control plane 1176 works with virtual network view(s) (logical view(s) of the network) and the middleware layer provides the conversion from the virtual networks to the physical view.

The centralized control plane 1176 transmits relevant messages to the data plane 1180 based on CCP application layer 1280 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1180 may receive different messages, and thus different forwarding information. The data plane 1180 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPV4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1180, the packet (or a subset of the packet header and content) is typically forwarded to the centralized control plane 1176. The centralized control plane 1176 will then program forwarding table entries into the data plane 1180 to accommodate packets belonging to the flow of the unknown packet. Once a specific forwarding table entry has been programmed into the data plane 1180 by the centralized control plane 1176, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of a transaction verification service implemented by a computing system for verifying a transaction between a user device, which is an extended reality mobile communication device, and a merchant device, wherein extended reality combines real and virtual environments, the method comprising:

receiving a transaction identifier for the transaction from the merchant device at an edgecloud of a 3$^{rd}$ Generation Partnership Project (3GPP) communication system servicing the merchant device, wherein the edgecloud is pairing of edge and cloud computing;

locating at least one transmitter within a target area serviced by the edgecloud to communicate with the user device;

requesting the at least one transmitter to transmit a radio signal with a location code to the user device;

receiving the location code from the user device at the edgecloud as a response to receiving the radio signal with the location code;

verifying the location code at the edgecloud; and forwarding the transaction identifier to a payment processing service, in response to verification of the location code received from the user device.

2. The method of claim 1, further comprising:

checking with the payment processing service whether a transaction can proceed prior to requesting the at least one transmitter to transmit the location code.

3. The method of claim 1, wherein the at least one transmitter is selected for a defined geo-referenced area in which location codes received from devices are to be verified.

4. The method of claim 1, wherein a plurality of transmitters is selected to transmit the location code to the user device.

5. The method of claim 1, wherein the location code can be sent as a broadcast key without handshaking between the user device, the merchant device, and the at least one transmitter.

6. The method of claim 1, wherein verifying the location code correlates the user device with a specific geographical area where the at least one transmitter is selected for transmitting the location code based on having a verified transmission area in the specific geographical area.

7. The method of claim 1, wherein verifying the location code correlates the user device with another user device or merchant device that is in proximity to the user device.

8. The method of claim 1, wherein verifying the location code correlates the location code sent by the at least one transmitter and the location code received from the user device.

9. The method of claim 1, wherein the location code can be used for temporal verification in addition to spatial verification.

10. A non-transitory machine-readable storage medium having stored therein computer program code which, when executed by a computer, causes the computer to perform a set of operations for verifying a transaction between a user device, which is an extended reality mobile communication device, and a merchant device, wherein extended reality combines real and virtual environments, the set of operations comprising:

receiving a transaction identifier for the transaction from the merchant device at an edgecloud of a $3^{rd}$ Generation Partnership Project (3GPP) communication system servicing the merchant device, wherein the edgecloud is pairing of edge and cloud computing;

locating at least one transmitter within a target area serviced by the edgecloud to communicate with the user device;

requesting the at least one transmitter to transmit a radio signal with a location code to the user device;

receiving the location code from the user device at the edgecloud as a response to receiving the radio signal with the location code;

verifying the location code at the edgecloud; and forwarding the transaction identifier to a payment processing service, in response to verification of the location code received from the user device.

11. The non-transitory machine-readable storage medium of claim 10, wherein the computer program code further causes the computer to perform operations comprising:

checking with the payment processing service whether a transaction can proceed prior to requesting the at least one transmitter to transmit the location code.

12. The non-transitory machine-readable storage medium of claim 10, wherein the at least one transmitter is selected for a defined geo-referenced area in which location codes received from devices are to be verified.

13. The non-transitory machine-readable storage medium of claim 10, wherein a plurality of transmitters is selected to transmit the location code to the user device.

14. The non-transitory machine-readable storage medium of claim 10, wherein the location code can be sent as a broadcast key without handshaking between the user device, the merchant device, and the at least one transmitter.

15. The non-transitory machine-readable storage medium of claim 10, wherein verifying the location code correlates the user device with a specific geographical area where at least one transmitter is selected for transmitting the location code based on having a verified transmission area in the specific geographical area.

16. A network device to perform a transaction verification service for verifying a transaction between a user device, which is an extended reality mobile communication device, and a merchant device, wherein extended reality combines real and virtual environments, comprising:

a storage medium having stored therein instructions to perform a transaction verification service; and a processor coupled to the storage medium, wherein the processor to execute the instructions to perform the transaction verification service, the transaction verification service to:

receive a transaction identifier for the transaction from the merchant device at an edgecloud of a $3^{rd}$ Generation Partnership Project (3GPP) communication system servicing the merchant device, wherein the edgecloud is pairing of edge and cloud computing;

locate at least one transmitter within a target area serviced by the edgecloud to communicate with the user device;

request the at least one transmitter to transmit a radio signal with a location code to the user device;

receive the location code from the user device at the edgecloud as a response to receipt of the radio signal with the location code;

verify the location code at the edgecloud; and forward the transaction identifier to a payment processing service, in response to verification of the location code received from the user device.

17. The network device of claim 16, wherein the transaction verification service is further to check with the payment processing service whether a transaction can proceed prior to requesting the at least one transmitter to transmit the location code.

18. The network device of claim 16, wherein the at least one transmitter is selected for a defined geo-referenced area in which location codes received from devices are to be verified.

19. The network device of claim 16, wherein a plurality of transmitters is selected to transmit the location code to the user device.

20. The network device of claim 16, wherein the location code can be sent as a broadcast key without handshaking between the user device, the merchant device, and the at least one transmitter.

* * * * *